United States Patent [19]
Kornrumpf et al.

[11] Patent Number: 5,235,159
[45] Date of Patent: Aug. 10, 1993

[54] CONTROL SYSTEM, METHOD OF OPERATING A HEATING APPARATUS AND CONTROLLED HEATING APPARATUS

[75] Inventors: William P. Kornrumpf, Albany; John D. Harnden, Jr., Schenectady; Robert P. Alley, Clifton Park, all of N.Y.

[73] Assignee: General Electric Company, Fort Wayne, Ind.

[21] Appl. No.: 562,712

[22] Filed: Aug. 6, 1990

Related U.S. Application Data

[63] Continuation of Ser. No. 173,491, Mar. 25, 1988, abandoned.

[51] Int. Cl.$^5$ .............................................. H05B 1/02
[52] U.S. Cl. .................................... 219/486; 219/512; 219/510; 219/483; 310/332
[58] Field of Search ........ 219/492, 494, 501, 508–512, 219/519, 483–486; 310/330–332

[56] References Cited

U.S. PATENT DOCUMENTS

| | | | |
|---|---|---|---|
| Re. 26,944 | 8/1970 | Getman | 219/413 |
| 4,256,951 | 3/1981 | Payne et al. | 219/492 |
| 4,296,449 | 10/1981 | Eichelberger | 361/3 |
| 4,424,439 | 1/1984 | Payne et al. | 219/501 |
| 4,443,690 | 4/1984 | Payne et al. | 219/506 |
| 4,447,799 | 5/1984 | Carlson | 338/22 |
| 4,493,980 | 1/1985 | Payne et al. | 219/450 |
| 4,551,618 | 11/1985 | Payne | 219/510 |
| 4,626,698 | 12/1986 | Harnden et al. | 307/38 |
| 4,634,842 | 1/1987 | Payne | 219/486 |
| 4,634,843 | 1/1987 | Payne | 219/486 |
| 4,639,578 | 1/1987 | Payne | 219/450 |
| 4,654,555 | 3/1987 | Ohba et al. | 310/332 |
| 4,658,154 | 4/1987 | Harnden et al. | 307/132 R |
| 4,670,682 | 6/1987 | Harnden et al. | 310/332 |
| 4,689,517 | 8/1987 | Harnden et al. | 310/332 |
| 4,692,596 | 9/1987 | Payne | 219/450 |

OTHER PUBLICATIONS

Paper entitled "Automatic Surface Cooking Utilizing Microprocessor Control", 37th Int'l Appliance Technical Conference, 1986.
Paper entitled "Microcomputers, A Technique for Electronic Control in the Appliance Industry", I.E.E.E. Appliance Techn. Conference, 1975.
Paper entitled "Monolithic Switch System for Low Cost Power Control", Proc. Nat'l. Electronics Conference, vol. XXIII, 1967.
Paper entitled "Application of Microcomputer Control to Appliances", I.E.E.E. Tech. Conference, 1967.
Paper entitled "User Friendly Touch Controls for Home Appliances", 35th Int'l Appliance Tech. Conference, 1984.
Technical paper entitled "Ultra-Low Power Consumption Relay with Piezo-Actuator", Omron Tateisi Electronics Co. Kyoto, Japan.
Technical paper entitled "Application of Piezoceramics in Relays", Electrocomponent Science and Technology, 1976, vol. 3.

*Primary Examiner*—Mark H. Paschall
*Attorney, Agent, or Firm*—Ralph E. Krisher, Jr.

[57] ABSTRACT

A control system for regulating electrical power input to the resistive heating elements of an electric heating apparatus, including domestic cooking appliances, is provided which employs at least one piezoceramic relay device. The electrical power is applied with the piezoceramic relay device responsive to control signals and with the control circuitry being directly and ohmically connected to the power source. In one embodiment, the control system employs individual piezoceramic relay devices for power regulation to the individual heating elements while in different embodiments a single piezoceramic relay device regulates power input to a pair of the heating elements. A method of operating the controlled apparatus in such manner and an apparatus having such control system are also disclosed.

163 Claims, 7 Drawing Sheets

CONTROL SYSTEM, METHOD OF OPERATING A HEATING APPARATUS AND CONTROLLED HEATING APPARATUS

This is a continuation, of application Ser. No. 07/173,491, filed Mar. 25, 1998, now abandoned.

This invention relates to power switching circuitry employing a piezoelectric relay device and more specifically to the control of a particular type apparatus with such means.

BACKGROUND OF THE INVENTION

Piezoelectric relay devices are recognized to provide a means for either initiating or interrupting current flow to a load device. A known piezoceramic type relay device for this purpose is disclosed in U.S. Pat. Nos. 4,670,682 and 4,689,517 both assigned to the assignee of the present invention. The relay device includes a piezoceramic bender member formed by at least two planar prepoled piezoceramic plate elements secured in opposed parallel relationship sandwich fashion on opposite sides of at least one central conductive surface and having outer conductive surfaces that are insulated from each other and the central conductive surface by the respective intervening piezoceramic plate element thicknesses. Movable contact associated with the movable bender coact with fixed contacts disposed thereby to either complete or interrupt an electrical circuit providing current flow from a power source to the load device. A representative form of this type relay device as disclosed in the above mentioned prior art patents employs a piezoceramic bender member which is selectively prepoled with clamping means secured at nonpoled portions adjacent to and mechanically supporting the selectively prepoled bender member in a cantilever manner for operating pairs of coacting electrical contact means and with the non-poled portions being mechanically unstrained and electrically neutral. The bender member is made to operate either side of a center position normally assumed by the bender member in an unenergized position to thereby enable different modes of operation. In one mode of operation, the relay device can simply serve as an on-off switch wherein one pair of coacting switch contacts either makes or breaks the electrical circuit with respect to the load device. In a different mode of operation, however, a pair of coacting switch contacts is provided on each side of the bender member to enable selective energization of multiple load devices. Both modes of operation with the prior art "bimorph" type bender switching devices are further said to be conducted in a similar manner wherein the DC energization potential used to actuate deflection of the bender member has the same polarity as the polarity of the prepoling potential used to prepolarize the prepoled piezoceramic plate element. The depolarization avoided by operating the relay devices in this manner provides dipole enhancement enabling relatively long term operation with load devices employing load voltages as high as 5000 volts and corresponding currents as high as hundreds of amperes.

In both above defined modes of operation, such piezoceramic relay devices have been recognized to afford major operational and structural advantages over either electromagnetic (EM) relays or semiconductor devices when employed in power switching applications. These advantages are reported in U.S. Pat. No. 4,658,154, also assigned to the present assignee, which further includes disclosure of piezoceramic relay switching circuits providing control of single and double load apparatus. The EM relays still widely employed for this purpose provide an interface between, for example, an electronic control circuit and a load circuit wherein the former handles the low power control signals for selectively energizing the relay coil to appropriately position the relay contacts coacting in the power circuit to switch relatively higher levels of power. When such relay contacts are closed, load current is conveyed, with virtually no losses, and when they are parted, load current is interrupted with the certainty only an air gap can provide. Over the years improvements in EM relays have resulted in increased efficiency and reduced physical size. That is, such relays can be actuated with control signals of rather low energy content to switch reasonably high levels of load current. For example, EM relays are available which can be actuated with a one watt control signal to switch several kilowatts of power at 115 or 230 volts AC. As a consequence, EM relays can be operated with signals generated by solid state control circuitry. On the other hand, the drawbacks associated with EM relays employed for controlling current flow in load circuits responsive to control signals still remains substantial. While current EM relays have been miniaturized as compared to earlier designs of the relays, their actuating power requirements are still quite large in contrast to, for example, state of the art solid state power switches. The current EM relays are still relatively complex and expensive to manufacture, for example, their coils typically require a multitude of turns of very fine wire. The coil resistance, consumes some power which must be provided by a reasonably stiff power supply. When, for example, EM relays are utilized in home appliance controls, relay operating power must be derived from a 115 or 230 volt AC utility source. The requisite power supply, particularly when an EM relay is operatively associated with a solid state control circuit, requires a transformer, electrolytic capacitors, regulators and protection to insure a reliable source of relay actuating current. Such power supplies are both costly and constitute a significant source of power dissipation. Moreover, in certain applications where high ambient magnetic fields are present, such as in motor starter applications, EM relays must be specially shielded to discourage spurious operation. The drawbacks associated with employment of EM relays in power switching circuitry has thereby resulted in a trend toward utilizing solid state switches, such as SCRs, Triacs, Thyristors, MOSFETs, IGTs and the like as the power switching output device. While such solid state switches are becoming relatively inexpensive and may be smaller in physical size than comparably rated EM relays, they do present a rather significant "on" resistance, which, at high current levels, results in considerable power dissipation. Thus, semiconductor power switches being utilized in high current applications must be properly heat-sinked for protection against thermally induced damage, and, as a consequence, with their heat-sinks can take up more physical space than do their EM relay counterparts. Moreover, solid state power switches must be protected against possible damage in spurious operation as a result of transients, electrostatic discharges (ESD) and electromagnetic interference (EMI). All of these protective measures represent an additional expense. In that such solid state power switches do not impose an air gap to restrain the flow of current in their "off" condition and because of their "on" condition failure mode, Underwriters Laboratory has disapproved of their application in numerous domestic appliances. Such disapproval has only been overcome in part with a combination of the solid state switches and the EM relays in some domestic appliances so as to provide the required air gap.

All of the foregoing major disadvantages found with employment of either EM relays or semiconductor switches as the power switching output device has prompted renewed interest in piezoelectric relays, including piezoceramic relay devices. Recent improvements in piezoceramic materials have enhanced their electromechanical efficiency for these relay applications. Piezoceramic drive elements may be fabricated from a number of different polycrystalline ceramic materials such as barium titanate, lead zirconate titanate, lead metaniobate and the like which are precast and fired into a desired shape such as rectangular-shaped ceramic plates. The piezoceramic relay devices require very low actuating current, dissipate minimal power to maintain an actuated state, and draw no current while in their quiescent or unenergized state. The electrical characteristics of the piezoceramic drive elements are basically capacitive in nature, and thus are essentially immune to ambient electromagentic fields. Such piezoceramic relay devices can be designed in smaller physical size than comparably rated EM relays. Since piezoceramic relay devices utilize switch contacts, contact separation introduces the air gap in the load circuit as required for UL approval in domestic appliance applications. Closure of these relay contacts provides a current path of negligible resistance, and thus unlike solid state power switches, introduces essentially no loss in the load circuit. Since additional structural and operational advantages for such improved piezoceramic relay devices can be found in the aforementioned prior art U.S. Pat. Nos. 4,670,682 and 4,689,517, both disclosures are hereby specifically incorporated into the present application in their entirety.

The suitability of such piezoceramic relay devices in controlling current flow within a particular apparatus understandably requires still other factors to be considered. Both operational characteristics desired in the apparatus as well as the environmental conditions being encountered have to be satisfied. For particular domestic appliances utilizing at least one resistive heating element for various household purposes to include electric ranges, toaster ovens, electric clothes dryers and electric fry pans, it is further desirable to provide such apparatus both at a low cost as well as enable low cost of operation by a user. Achieving the latter objective is facilitated by operating the domestic appliances directly from the available line voltage power supply with a minimal number and size of components in the control circuitry and while further reducing any susceptibility of the control circuitry to EMI and line transients. Employment of at least one piezoceramic relay device in the control circuitry could theoretically enable current flow to one or more operatively associated resistive heating elements most efficiently with relative immunity to ambient electromagnetic fields. The piezoceramic relay device is further particularly suited for use in combination with low power-drain electronic circuit components to provide the control signals for actuation of the piezoceramic bender member and thereby enable the relay contacts to be either opened or closed. Simplification of the control circuitry is particularly desirable for all of the above illustrated household appliances since it permits more space to be utilized for work tasks and makes it easier to contain the entire control means within the apparatus for a cleaner design appearance.

Understandably, the ability of a piezoceramic relay device and its associated control circuitry to function properly in a relatively high temperature environment represents a still further important consideration. The conventional control means now being employed in electric ranges are required to operate at a minimum 70° C. ambient for extensive time periods. Thus, relay contacts must open and close reliably in this operating environment over the relatively long lifetime demanded for most household appliances. While piezoceramic relay devices have been found capable of long term reliable operation, significant problems are recognized to still exist and which have heretofore only been ameliorated with additional circuit means being employed. Specifically, contact arcing is experienced for different reasons as the relay contacts are opened and closed and which has required additional circuit means to reduce wear and tear at the contact interface. The arcing problem occurring when the contacts are opened is attributed to a rise of reapplied forward potential across the contacts as they open which can be lessened with snubber circuits as proposed in both aforementioned U.S. Pat. Nos. 4,658,154 and 4,670,682 patents. The arcing problem which occurs when these contacts are closed is attributed to mechanical bounce upon closure and this problem is dealt with in a still further commonly assigned U.S. Pat. No. 4,626,698. As therein proposed, novel zero crossing synchronous AC switching circuits are utilized with a piezoceramic relay device including circuit means to initially impress a relatively low voltage energization potential across the piezoceramic bender member to soften its movement and curtail contact bounce after initial contact closure. It is also proposed therein that such circuits be operated to extinguish current flow through the contacts when being opened to help alleviate the former arcing problem. The seriousness of both arcing problems can be appreciated from a still further recommendation appearing in said reference for utilization of specialized contact metals to withstand arc formation whenever the relay contacts are being separated.

Recent legislation in many states now requires domestic appliances to meet minimum energy efficiency standards. For the above illustrated domestic electrical heating appliances such a requirement understandably dictates efficient use of electrical power whenever operating the particular apparatus. To further illustrate the general nature of this problem in connection with conventional electric range operation, one common control means utilizes a temperature sensing element, such as a thermostat, in combination with a programmed microprocessor control unit to effect automated temperature feedback control with respect to the resistive heating elements being employed in both surface heating and oven units. Power is applied to the resistive heating elements responsive to the thermal control means as further based upon the power level setting selected by the operator. The percentage of time power is applied in accordance with the power level setting is customarily termed the duty cycle in the known time-ratio mode of operation. Since the conventional resistive heating elements operate with considerable thermal inertia, however, such thermal control means has proven rather energy inefficient at both high and low power level settings. More energy efficient electronic control means for an electric range are disclosed in a further commonly assigned U.S. Pat. No. 4,443,690, whereby such temperature sensing means can be eliminated. In accordance with the improved control system, the power setting selected by the operator is monitored for utilization with electronic counter means provided in the microprocessor control unit and which is incremented or decremented at a rate that is approximately proportional to the rate of increase or decrease of temperature of the controlled heating element for that power setting. By knowing the operator setting and counting zero crossover points in the microprocessor, the supply power to a particular heating element as determined by emperically determining the thermal losses for different power levels, the effective energy in the heating unit is determined. This determines the increment rate and the count of the counter becomes a measure of the effective energy in the heating unit at any given time. Where the thermal mass of a particular heating element is large, the increment rates can be selected very accurately, regardless of load conditions. A more energy efficient control can be exercised with the improved control system. For example, when a controlled heating element is already operating at a high power setting and the operator selects a lower power setting there will be no power applied to the heating element until needed to maintain the lower power setting. On the other hand, selection of a higher power setting for a heating element being operated at lower power setting results in full power being applied to the heating element in order to decrease the time required to reach the higher power setting. Since the improved control system employs no temperature sensing means or closed loop temperature control circuitry as required in the conventional control means but rather utilizes the same circuitry of the existing microprocessor control unit, it can be further appreciated that incremental cost for its implementation is essentially negligible.

As recognized in the aforementioned U.S. Pat. No. 4,658,154, the operation of a piezoceramic relay to regulate power input to a pair of resistive load devices in a manner precluding simultaneous operation of the respective devices can be carried out with minimum power consumption. Such operational control of the relay device as therein recognized employs high voltage integrated circuitry being powered directly from a conventional utility source such as available 115 volt or 230 volt AC power sources. For such relay control circuitry to efficiently and reliably regulate power input to the individual heating elements now employed in various electric heating apparatus requires that a number and variety of still other important criteria be met. Typical criteria can further be illustrated in connection with the conventional oven control means now being utilized in a household electric range. With the control management employed in the above cited U.S. Pat. No. 4,443,690 patent as well as in other conventional control systems for the electric range, the load current is switched to the individual heating elements by electromechanical means. The switching function is now done either with solid state switches such as high current transistors, triacs, etc. or with electromagnetic relays. As previously indicated, the solid state switching devices require additional heat-sink means and/or fans to remain operational by reason of the typically high current loads being required by the heating elements. Moreover, domestic employment of solid state switching devices necessitates conventional use in combination with an electromagnetic relay to satisfy UL requirements for an air gap interruption of the electrical circuit as previously indicated. The electromagnetic relays now in current use with the aforementioned microprocessor control arrangement have an additional drawback in making the domestic appliance noisy to operate. Since a relay device is actuated several times per minute in a domestic appliance, a distinct audible noise is caused each operating cycle attributable to the impact. Replacing the conventional switching means now employed in a domestic electric heating appliance having multiple resistive heating elements with a piezoceramic relay device thereby affords significant advantages. In the illustrated electric range, a piezoceramic relay is capable of switching these high wattage loads for at least one and up to ten million duty cycles now required over the design life of the appliance. A relatively quiet operation by the device as well as simple control circuitry needed for its operation represent a significant further advantage. More energy efficient operation hence a lower cost of operation by the operator can also be expected for a piezoceramic relay device which can be actuated with microwatts as compared with the watt power requirements for the now employed electromagnetic relay devices. Additionally, the employment of a piezoceramic relay as the power output switching device in this type domestic appliance further enables the controlled apparatus to be operated automatically with simple solid state control means.

The customary circuit relationship for multiple heating elements in most electric heating apparatus is by parallel connection across the power conductors and with the individual heating elements being further connected in series to at least one of the now employed electromagnetic relay devices. It is further common in domestic electric ranges to require that a pair of the switching devices be series connected to each heating element as a safety precaution insuring that each power conductor in the power supply will be interrupted. From these considerations it can be appreciated that replacing the electromagnetic relays with piezoceramic relay devices afford a far more reliable switching arrangement. Simultaneous operation of the respective heating elements due to malfunction of the switching devices can thereby be avoided to a much greater extent. As compared with the electromagnetic relays, the lower actuating power requirements, simpler construction and simpler control circuitry for a piezoceramic relay device as well as its relative immunity to spurious influences effectively enables a fail-safe manner of operation.

It is a principal object of the present invention, therefore, to provide a more energy efficient system for the regulation of electrical power in an electric heating apparatus employing at least one resistive heating element.

It is still another important object of the present invention to provide control means employing at least one piezoceramic relay device to regulate electrical power input in an electric heating apparatus employing at least one resistive heating element in a more fail-safe manner.

A still further important object of the present invention is to provide control means for the regulation of electrical power in an electric heating apparatus employing at least one resistive heating element with improved temperature control means.

Still another important object of the present invention is to provide improved electronic control means for automatic regulation of electrical power in an electric heating apparatus employing at least one resistive heating element.

A still further important object of the present invention is to provide a novel method for regulation of electrical power in an electric heating apparatus employing at least one resistive heating element.

Still a further important object of the present invention is to provide a method of operating piezoceramic relay means to more efficiently regulate electrical power input to at least one resistive heating element in an electric heating apparatus.

Still another important object of the present invention is to provide a more efficient method to automatically regulate electrical power input in an electric heating apparatus employing at least one heating element.

Another important object of the present invention is to provide a more efficient electric heating apparatus utilizing novel control mean to more reliably regulate electrical power input to at least one resistive heating element.

Another important object of the present invention is to provide control means regulating electrical power input in an electric heating apparatus utilizing a plurality of resistive heating elements in a manner avoiding unintended simultaneous operation of the respective heating elements.

Still another important object of the present invention is to provide an electric heating apparatus employing simpler and lower cost control means to regulate electrical power input to at least one resistive heating element with piezoceramic relay means.

A still further important object of the present invention is to provide an electric heating apparatus employing improved electronic control means to automatically regulate electrical power input to one or more resistive heating elements.

A still further important object of the present invention is to provide an electric range utilizing novel control means to regulate electrical power to a plurality of resistive heating elements.

Another important object of the present invention is to provide a household cooking appliance employing novel control means to automatically regulate electrical power input to at least one resistive heating element in a more energy efficient manner.

These and still further objects of the present invention will become apparent upon considering the following detailed description for the present invention.

SUMMARY OF THE INVENTION

Novel control means have now been discovered for regulating the electrical power input in various type electrical heating apparatus which employ one or more resistive heating elements. In one aspect of the present invention, a piezoceramic relay device is connected in circuit relationship with an individual heating element to enable connection of the power source to the heating element, the piezoceramic relay device including terminal means for connection to the power source and a movable prepoled piezoceramic bender member having movable electrical contact means which coact with fixed electrical contact means disposed thereby, the fixed electrical contact means being connected to terminal means of the heating element and with the control circuitry operating the piezoceramic relay device being responsive to a power setting selected by an operator. The control circuitry is directly and ohmically connected to the power source and the piezoceramic relay device for the completion of a circuit therebetween and which can be actuated by a selected power setting causing the prepoled piezoceramic bender member to deflect and make electrical contact with the coacting fixed electrical contact means.

In a different aspect of the present invention wherein the particular electric heating apparatus employs at least two resistive heating elements, a piezoceramic relay device can be connected in circuit relationship to enable individual connection of the power source to either heating element, the relay device including terminal means for connection to the power source and a movable prepoled piezoceramic bender member having coacting contact means for individual connection to terminal means provided to each heating element, and with the bender member responsive to control signals being caused to deflect and complete a circuit between the power source and the terminal means of one heating element or to deflect and complete a circuit between the power source and the terminal means of the other heating element.

In a still different aspect of the present invention for regulating power input to a pair of resistive heating elements in an electric heating apparatus, a single piezoceramic relay device is again connected in circuit relationship to enable individual connection of the power source to either heating element. The relay device further includes terminal means for connection to the power source and a movable prepoled piezoceramic bender member having coacting contact means for individual connection to terminal means provided in each heating element. When actuated by the control circuitry the bender is caused to deflect either in a first direction to complete a circuit between the power source and the terminal means of one heating element or to deflect in a second direction and complete a circuit between the power source and the terminal means of the other heating element.

In a different aspect of the present invention for power regulation to a pair of resistive heating elements in an electric heating apparatus, a single piezoceramic relay device having a bifurcated construction with a pair of movable prepoled piezoceramic bender elements is connected to the power source, each of the bender elements having movable electrical contact means which coact with fixed electrical contact means disposed thereby, the fixed electrical contact means again being separately connected to terminal means provided to each heating element and with each of the bender elements further maintaining the movable electrical contact means spaced apart from the fixed electrical contact means while in an unenergized condition. Associated control circuitry responsive to the control signals causes the actuated bender element to deflect and complete a circuit between the power source and the terminal means of the heating element operatively associated with the actuated bender element.

In still other aspects of the present invention, a single piezoceramic relay device can be series connected to an individual heating element in a particular heating apparatus and with such interconnection being duplicated with respect to a heating apparatus having a plurality of the heating elements. Thus, a piezoceramic relay device is connected to a heating element in the present control system to operate either as an on-off power switching means or as a three position switching means and with both modes of operation maintaining the coacting contact means of the device in a fail-safe spaced apart relationship when the device is in an unenergized condition responsive to the control signals.

The control signals operating a piezoceramic relay device in the present control means can be derived in various ways. As above pointed out, power control signals can be employed to actuate the movable prepoled bender means in the relay device and with such type control signals being provided with a power level being selected by an operator. Such manually operated power selection means can further include additional safety switch devices to interrupt power being supplied to a heating element when the power selection means are turned to an "off" condition. The power control signals can also be provided automatically with solid state control circuitry in an electric heating apparatus such as in the form of a household cooking range. As also previously pointed out with respect to this appliance in connection with the aforementioned commonly assigned U.S. Pat. No. 4,443,690, the initial power level which is applied to the heating elements responsive to a power setting selected by the operator is at rates other than that eventually required for the selected power setting. When a heating element controlled in this manner is already operating at a higher power setting and the operator selects a lower power setting there will be no power applied to the heating element until needed to maintain the lower power setting. On the other hand, selection of a higher power setting for a heating element being operated at a lower power setting results in full power being applied to the heating element in order to decrease the time required to reach the higher power setting. The disclosure in the U.S. Pat. No. 4,443,690 is specifically incorporated herein by reference since the fully automated control means therein more fully disclosed can be employed to derive the power control signals in connection with various aspects of the present invention. Temperature control signals are also employed in accordance with various aspects of the present invention. Accordingly, the present control circuitry can be made responsive to control signals derived with temperature sensing means so that the temperature achieved when a heating element is being operated can be determined with temperature feedback control. A more precise temperature control can also be achieved in the heating apparatus according to various aspects of the present invention whereby solid state temperature sensing means, such as a thermistor device can be in the control circuitry. By further operating a piezoceramic relay device as a three position switching means in the present control system, it becomes possible to still further modulate the power level being applied to a heating element in an electric heating apparatus. Thus, an electric heating apparatus being supplied with the customary 230 volt AC power source, can connect the present relay device to the power source so that power is applied to an operatively associated heating element with the full 230 volt supply at higher selected power levels whereas a 115 volt supply is provided at lower selected power levels. Operating the relay device in this manner can lengthen its contact life as well as reduce thermal stress upon the associated heating element.

In one aspect of the present invention, the electric heating apparatus is in the form of an electric range and which can have a surface cooking mechanism as well as an oven cooking mechanism. The power regulation system therein utilized is responsive to both power control signals and temperature control signals as a means to achieve a predetermined operating temperature for the resistive heating elements. Accordingly, various known means for temperature control now being employed for this purpose in conventional household type electric ranges can readily be incorporated into the present power regulation system to include temperature feedback control means, proportional temperature control means and the previously mentioned digital temperature modeling control means as described in the referenced U.S. Pat. No. 4,443,690. A predetermined temperature setting can be selected by an operator with a mechanical control knob or touch control means as already carried out in the conventional range appliances and with the selected temperature control means deriving an error signal which is the function of the difference between the sensed temperature and a predetermined temperature setting selected by an operator. A similar selection can be made by an operator to determine the power level at which a heating element is to be operated. For example, a manually operated control knob can be employed to derive the power control signal as a variable DC voltage in the conventional manner from a plurality of available power settings. Operating the overall power regulation system in such manner thereby subjects a heating element to control signals initially determined by the operator with selection of a power setting and with subsequent temperatures achieved by operating the heating element being determined by the operatively associated temperature control means. At cooking temperatures selected by an operator below a boil temperature in a typical surface cooking mechanism, for example, full power can be applied to the controlled heating element in accordance with the above summarixed time-ratio mode of power control and with the percentage of time power is applied thereafter being reduced by control signals from the operatively associated temperature sensing means when the sensed temperature reaches the controlled temperature band or range of its operation. A similar temperature controlled mode of operation can be exercised in the surface cooking mechanism being illustrated at a cooking temperature selection above boiling temperatures, such as frying temperatures. Again, power can be appliied to the controlled heating element in a time-ratio mode of power control but at generally higher percentage of time in the duty cycle so that higher operating temperatures can be achieved and with power application thereafter being regulated with temperature control means after the desired operating temperature has been reached. At boil temperature operation, it can be appreciated that control signals from the temperature control means no longer have significance, hence control of the heating thereat is achieved with the time-ratio mode of power control. On the other hand, it should be noted that the temperature control means in the herein illustrated control means remains operational to avert operating temperatures being reached by the controlled heating element which are above a water boiling point (around 212° F.) since the food contents being boiled could eventually lose all moisture.

In a typical oven cooking mechanism utilizing the illustrated control means, only the desired cooking temperature is generally selected by the operator but with an accompanying time period either prior to or for the cooking duration also possibly being selected in the conventional manner. Since the desired operating temperatures in a typical oven cooking mechanism will be above the water boiling point, although lower warming temperatures are sometimes provided, the customary operating mode for the mechanism utilizes temperature feedback control. Accordingly, the oven cooking mechanism in the herein illustrated control means can be operated by temperature feedback control with full power being applied until the temperature reached with the controlled heating element or elements falls within the control band of the selected temperature control means. For example, a typical oven employing the herein illustrated control means to provide the customary self-cleaning operation can apply full power until a predetermined very high temperature is reached and thereafter maintain such temperature with conventional temperature control means, such as a thermostat or thermistor circuit. Still other operating modes now employed in a conventional oven cooking mechanism can understandably be carried out in a similar manner with the herein illustrated control means to include time bake, broil, bake and the like.

In a different aspect of the present invention, the control means employing a piezoceramic relay device to regulate power input to at least one resistive heating element in various type electric heating apparatus utilizes solid state control circuitry providing several important advantages. Such control means not only enable a more precise and reliable degree of control to be achieved than now being experienced in the conventionally operated apparatus but does so more energy efficiently and with far simpler construction means. First of all, the previously mentioned low power operating characteristics of a piezoceramic relay device makes it an ideal switching means to be operated with low power solid state drive circuits of many types. To simply indicate the nature and variety of already known solid state control circuitry found suitable for household appliances, references can be made to a number of technical publications including "Monolithic Switch System for Low Cost Power Control", Proceedings of the National Electronics Conference, Volume XXIII, 1967; "User Friendly Touch Controls For Home Appliances", 35th International Appliance Technical Conference, 1984; "Microcomputers, A Technique for Electronic Control In The Appliance Industry", I.E.E.E. Appliance Technical Conference, 1975; "Applications of Microcomputer Control to Appliances", I.E.E.E. Appliance Technical Conference, 1977; and "Automatic Surface Cooking Utilizing Microprocessor Control", 37th International Appliance Technical Conference, 1986. A still further reference to other issued U.S. patents to the assignee of the present invention including U.S. Pat. Nos. 4,256,951; 4,424,439; 4,447,799; 4,296,449; 4,551,618; and 4,634,842 makes it likewise evident that solid state circuitry employing both analog and digital circuit means has been developed for various heat control applications to include either a surface cooking mechanism or an oven cooking mechanism in the above illustrated household electric range. Accordingly, it should be appreciated in connection with this aspect of the present invention that the solid state control circuitry herein being employed includes both analog and digital circuit means to still further include hybrid, integrated circuit and discrete component implementation.

Another important advantage achieved by operating the piezoceramic relay device with solid state circuitry is a smaller physical size requirement which enables the entire control means to be packaged in a minimal space and with significantly reduced wiring costs. It becomes thereby possible to locate the entire control means for a surface cooking mechanism or an oven cooking mechanism in the particular heating apparatus being illustrated at a convenient control location and to further configure such improved control means as a single plug-in module enabling repair or replacement in a easier manner. Still another important advantage achieved upon utilizing a piezoceramic relay device in combination with solid state control circuitry of the type above illustrated is a further ability to replace the electromechanical thermostat means now commonly employed in the conventional electric heating apparatus for temperature control with solid state temperature control means. The conventional thermostat means are employed in order to provide control signals at a sufficient power level to actuate the operatively associated EM relay devices and lack the ability to control outside a relatively narrow temperature range while also causing considerable audible noise when the EM relay device is actuated. Utilizing solid state temperature control means, such as a thermistor circuit, in the solid state control circuitry operating a piezoceramic relay device avoids both drawbacks and provides a more precise temperature control with a continuous feedback signal over a far greater temperature range. In this manner, an operator employing such improved control means as incorporated in the above illustrated household range is far better able to achieve the cooking temperatures commonly given in cookbooks and other recipe publications.

A piezoceramic relay device enabling improved control means in accordance with various aspects of the present invention utilizes the aforementioned "bimorph" construction wherein the piezoceramic bender member is formed by at least two planar prepoled piezoceramic plate elements being secured in opposed parallel relationship sandwich fashion on opposite sides of at least one central conductive surface and having outer conductive surfaces that are insulated from each other and the central conductive surface by the respective intervening piezoceramic plate element thicknesses. The movable contact means operatively associated with the movable piezoceramic bender member can be disposed on the same or opposite sides of the bender member as well as placed on side locations or even positioned upon extensions physically connected to the bender member, all as further described herein and in the aforementioned patent references. A still further preferred form of the piezoceramic bender member having the "bimorph" construction is selectively prepoled with clamping means being secured at non-poled portions adjacent to and mechanically supporting the selectively prepoled bender member in a cantilever manner for operating single or multiple pairs of coacting electrical contacts, the non-poled portions being mechanically unstrained and electrically neutral. Control circuitry operating the piezoceramic relay device with lower power consumption is connected in circuit relationship across ones of the prepoled piezoceramic plate elements to provide DC energizing potential for selective deflection of the bender member responsive to control signals derived with operation of the controlled heating apparatus. The DC energizing potential is preferably provided with the same polarity as the polarity of the prepoling potential used to polarize the piezoceramic plate elements so as not to depolarize the relay devices during operation. Actuation of a relay device responsive to the control signals can be provided with associated low power drain solid state circuit means as above illustrated. Suitable relay drive circuit means for the above illustrated household range appliance can simply include a diode-capacitor network for developing the high voltage DC energizing potential for operating the piezoceramic relay device in combination with dropping resistor means for any control logic and semiconductor active devices for selectively applying the high voltage energization to the piezoceramic bender member. In one such drive circuit means, series connected isolating resistor means can be provided to limit the current drawn from an AC power source while charging resistor means can also be provided to conduct the energizing potential to the piezoceramic bender member. The drive circuit embodiments can also include first resistor means to discharge the first piezoceramic plate element when energiziation thereof has been terminated along with second resistor means to discharge the second piezoceramic plate element when its energization has been terminated. While control signals to actuate this piezoceramic relay device can be derived by various means, as above pointed out, temperature control signals can be derived in a representative solid state control circuit with operatively associated analog circuit means. One type solid state analog circuit providing temperature control signals in this manner comprises first amplifier means which compares an input DC voltage representing a predetermined temperature setting selected by an operator with a feedback voltage obtained by modifying its output voltage to charge associated capacitor means and applying the first amplifier output voltage to a second amplifier means for comparison with a sawtooth reference voltage, the output voltage from the second amplifier means providing control signals to a pair of active devices in the control circuitry. For the purpose of automatically providing temperature control signals to a pair of heating elements with the same type solid state control means, a commercially available CMOS quad comparator device can be employed having a duplicate dual comparator network as herein described. In the latter circuit embodiment, the control signals being applied to the first heating element are derived in the solid state analog circuit device with a first sawtooth reference voltage having an inverse relationship with respect to the second sawtooth reference voltage used to derive the control signals being applied to the second heating element. Regulating power input to the individual heating elements in this manner avoids simultaneous power application to both heating elements which can overload the power supply.

DETAILED DESCRIPTION OF THE PREFERRED EMBODIMENTS

Figure 1:
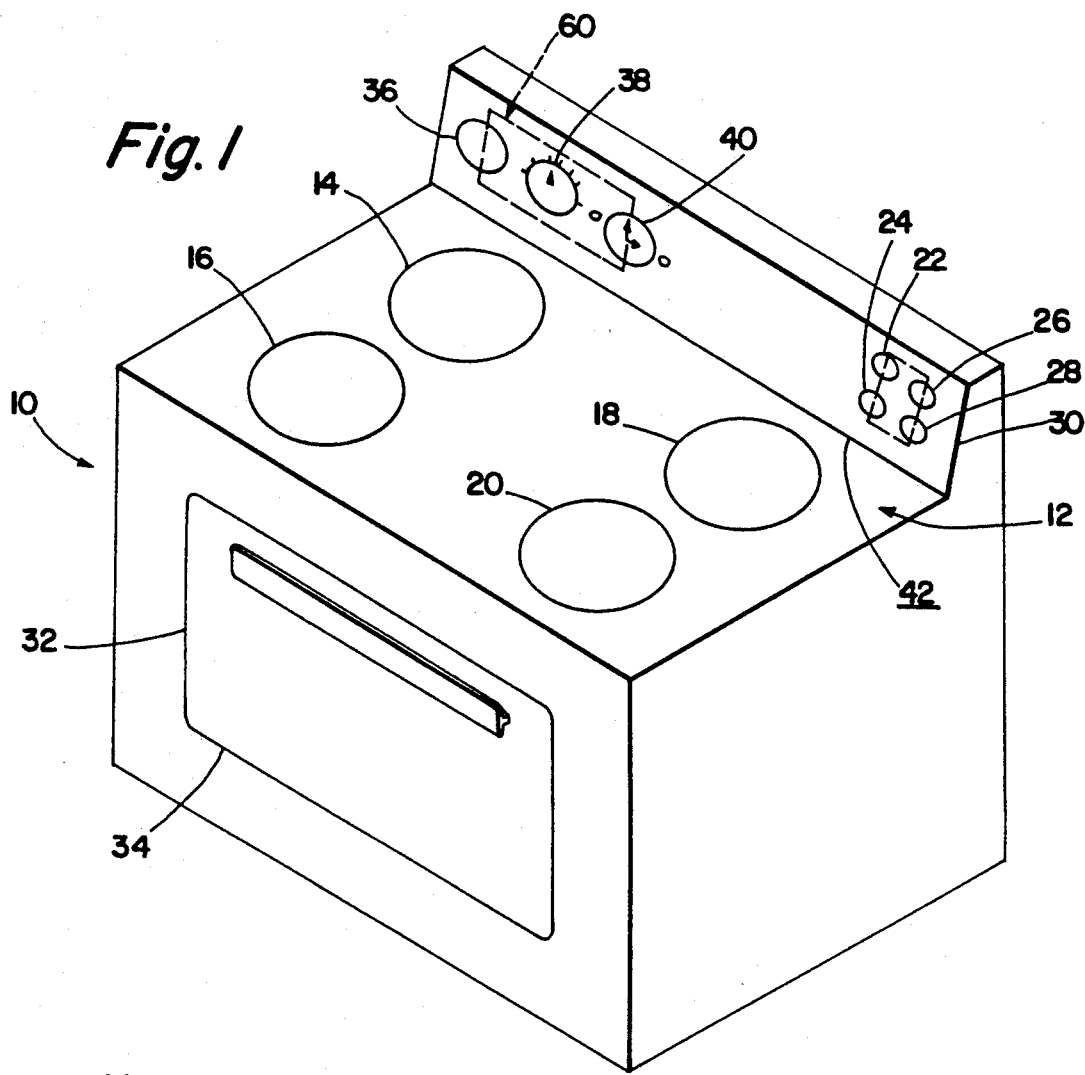
FIG. 1 is a representative electric range appliance embodying one form of control means according to the present invention.

Referring now more specifically to the drawings, the preferred embodiments of the present invention are illustrated in connection with an electric heating apparatus in the form of a household range appliance of the type more fully described in U.S. Pat. No. Re. 26,944, reissued Aug. 25, 1970 to Charles Getman and U.S. Pat. No. 4,639,578, issued Jan. 27, 1987 to Thomas R. Payne. Both patents are assigned to the General Electric Company and both disclosures are specifically incorporated herein by reference. As shown in FIG. 1, there is illustrated a typical household type electric range 10 embodying one form of the present control means. The range includes a surface cooking mechanism 12 having four resistive heating elements 14, 16, 18 and 20. Manually operated control knobs 22, 24, 26 and 28 are mounted upon a control panel 30 to enable power setting levels for the individual heating elements to be selected by an operator from a plurality of available power settings (not shown) in the conventional manner. The range 10 further includes a pair of resistive elements (not shown in the present drawing but further described in connection with the oven cooking mechanism embodiment depicted in FIG. 4) which are housed within the oven compartment 34. Since the present invention provides improved power regulation of an oven cooking mechanism as well as a surface cooking mechanism, however, a further description is given in connection with the range embodiment herein being depicted for operation of a typical oven cooking mechanism employing such improved control means. Accordingly, a still further manually operated control knob 36 mounted on the control panel 30 permits an operator to select a power setting level for control of the oven cooking mechanism 32 in the same general manner as previously described in connection with the presently employed surface cooking mechanism. Operational similarity in the power control means provided in both cooking mechanism embodiments resides in an ability to select such modes of operation as broil, bake, time bake, self-clean and an "off" condition with control knob 36 in the oven cooking mechanism 32 while operating modes such as simmer, medium boil, boil and an "off" condition can be provided with control knobs 22, 24, 26 and 28 in the surface cooking mechanism 12. Operational distinctions exist between the illustrated cooking mechanisms, however, in that temperature and time control means are provided for the present oven cooking mechanism. Accordingly, a further manually operated control knob 38 is provided on control panel 30 enabling the user to select the cooking temperatures to be achieved in the oven compartment 34 when the operatively associated heating elements are being operated with temperature control signals as well as power control signals in accordance with the present control means. A still further conventional timer 40 is also mounted on the control panel 30 enabling an operator to select the time duration for a selected operating mode in oven cooking mechanism 32 or a predetermined time interval preceding initiation of the selected operating function.

Figure 2:
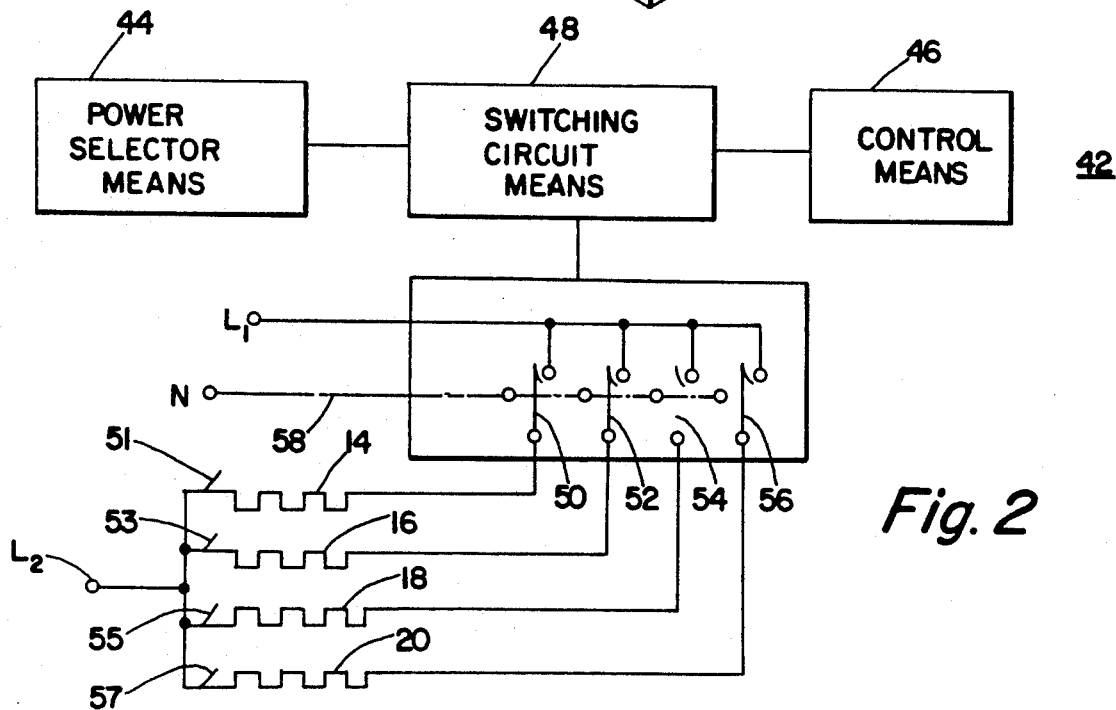
FIG. 2 is a functional block diagram for one aspect of the present control means as employed in the surface cooking mechanism of the FIG. 1 apparatus.

A typical power regulation system 42 employing the present control means in connection with the above described cooking mechanism embodiments is depicted in block diagram in FIG. 2. An illustrative control arrangement is provided in the present drawing only for the resistive heating elements 14, 16, 18 and 20 being employed in the cooking mechanism 12 since the control arrangement for oven cooking mechanism 32, which employs temperature control means as well as power control means, is to be further described as previously mentioned in connection with the FIG. 4 embodiment dealing with the latter mechanism. On the other hand, it should be kept in mind at this time that the power control means which can be utilized in either cooking mechanism remains essentially the same with respect to both structural configurations of the particular piezoceramic relay devices being operated and the control circuitry employed to actuate such relay devices. Accordingly, power selector means 44 derives control signals for independent operation of the heating elements 14, 16, 18 and 20 in the surface cooking mechanism 12 responsive to power settings selected by the operator from a plurality of power settings available in the control knobs 22, 24, 26 and 28. Such power control signals can be derived in the conventional manner with potentiometer means physically secured to said control knobs. The DC control signals are further processed by operatively associated analog or digital circuit means 46 to regulate the percentage of time power is applied to an operatively associated heating element in the previously described customary manner for power regulation in a surface cooking mechanism as dictated with a power level setting selected by an operator. The processed control signals are thereupon applied to further operatively associated switching circuit means 48 which enable actuation of piezoceramic relay devices 50, 52, 54 and 56 for consequent electrical connection of the power source to an individual heating element. As can be noted from the drawing, the relay devices are each series connected to an individual heating elment in the illustrated surface heating mechanism embodiment for independent control of electrical power thereto. The relay devices are further constructed and operated to maintain the coacting contact means open or spaced apart when a relay device is in an unenergized condition but deflect in the previously disclosed manner to switch the associated heating element into conduction responsive to the applied power control signals. The drawing further includes normally open switch devices 51, 53, 55 and 57 enabling both power conductors $L_1$ and $L_2$ to be interrupted when the manually operated power selector means are turned to an "off" condition. Optional control terminals 58 are also provided to the neutral power conductor N thereby enabling the individual piezoceramic relay devices 50, 52, 54 and 56 to connect the individual heating elements to either a conventional 115 volt AC power supply or to a conventional 230 volt AC power supply. Such optional switching arrangement can be provided by reason of a previously explained capability for a piezoceramic relay device to deflect in different directions when providing electrical interconnection between the power source and its terminal contacts. In this manner, the individual heating elements can be provided with a 115 volt AC power supply at a lower selected power level by interconnection of an associated relay device between the neutral power conductor and either power conductor while being provided with a 230 volt AC power supply at higher selected power settings in order to achieve the benefits also previously explained.

Operation of an individual piezoceramic relay device in the foregoing illustrative embodiment is achieved with the relay device being connected in circuit relationship with an individual heating element to enable connection of the power source to the heating element. The piezoceramic device, as more fully explained hereinafter in connection with the relay structural configurations disclosed in FIG. 9, includes terminal means for connection to the power source and a movable prepoled piezoceramic bender member having movable electrical contact means which coact with fixed electrical contact means disposed thereby, the fixed electrical contact means being connected to terminal means of the heating element and with the control circuitry operating the piezoceramic relay device being responsive to a power setting selected by an operator. The control circuitry is directly and ohmically connected to the power source and the piezoceramic relay device as also more fully explained hereinafter in connection with the FIG. 6-7 electrical circuit diagrams, for the completion of a circuit therebetween and which is actuated by a selected power setting causing the prepoled piezoceramic bender member to deflect and make electrical contact with the coacting fixed electrical contact means. Representative control circuitry enabling operation of the relay device in such manner can be provided entirely with solid state circuit means. Accordingly, analog solid state circuit means 46 can be furnished with input DC voltages representing the selected power levels to form suitable control signals enabling actuation of an individual piezoceramic bender member with operatively associated solid state switching circuit means 48. A suitable solid state analog circuit means 46 for this purpose can be essentially the same circuit means previously disclosed in connection with deriving suitable temperature control signals in accordance with one aspect of the present control means. As therein explained, such analog circuitry derives the control signals with first amplifier means which compares an input DC voltage now representing a power setting selected by an operator with a feedback voltage obtained by modifying its output voltage to charge associated capacitor means and applying the first amplifier output voltage to a second amplifier means for comparison with a sawtooth reference voltage, the output voltage from the second amplifier means providing control signals to a pair of active devices in the associated solid state switching circuit means 48. Representative solid state switching circuit means 48 can also be provided in the previously disclosed manner to include a diodecapacitor network for developing the higher voltage DC energizing potential which actuates an individual piezoceramic bender member with a pair of high voltage active devices, such as transistors and the like. Dropping resistor elements can also be included in the drive circuit means for any control logic being employed to operate the individual heating elements with fully automated preprogrammed digital control means. In further representative solid state switching circuit means 48, series connected isolating resistor elements can be provided to limit the current being drawn from the AC power source while charging resistor elements can also be provided to conduct the energizing potential to the piezoceramic bender member. Such drive circuit embodiments can also include first resistor means to discharge respective ones of the plate elements when energization thereof has been terminated.

It can likewise be appreciated from the preceding description given with respect to various structural configurations which a piezoceramic relay device can adopt in electrically connecting an individual heating element to the power source that modifications in the above illustrated power regulation system are contemplated. For example, the control signals being generated in the analog circuit means 46 can operate a pair of heating elements with the control signals operating one heating element being derived with a first sawtooth reference voltage having an inverse relationship with respect to a second sawtooth reference voltage used to derive control signals operating the other heating element and thereby avoid simultaneous power application to the operatively associated heating elements. The particular analog circuit means being operated in such manner can conveniently comprise a pair of the dual comparator networks above described such as provided with the previously disclosed CMOS quad comparator device and which further derives the sawtooth reference voltages with unijunction relaxation oscillator circuit means connected in circuit relationship with a pair of series connected feedback amplifier means so that the output from the first amplifier means provides the first sawtooth reference voltage and which upon further being applied to the second amplifier means provides the second sawtooth reference voltage. In a different modification to the above illustrated power regulation system whereby a single piezoceramic relay device can regulate power input to a pair of heating elements, the relay device can be connected in circuit relationship to enable individual connection of the power source to either element, the relay device including terminal means for connection to the power source and a movable prepoled piezoceramic bender member having coacting contact means for individual connection to terminal means provided to each element, and control circuitry directly and ohmically connected to the power source and the terminal means of the piezoceramic relay device which responds to the control signals and causes the bender member to deflect and complete a circuit between the power source and the terminal means of one heating element or to deflect and complete a circuit between the power source and the terminal means of the other heating element. One suitable relay device for actuation in such manner comprises a bimorph type bender construction previously described with a pair of coacting movable and fixed electrical contact means which can be disposed on opposite sides of the bender member to enable deflection in a first direction for completion of a circuit to the first heating element and deflection in a second direction for completion of a circuit to the other heating element. Another suitable relay device for operative association with a pair of resistive heating elements comprises a piezoceramic relay device having a bifurcated construction with a pair of movable prepoled piezoceramic bender elements connected by terminal means to the power source, each of the bender elements having movable electrical contact means which coact with fixed electrical contact means being separately connected to terminal means provided to each heating element, and with each bender element maintaining the movable electrical contact means spaced apart from the fixed electrical contact means while in an unenergized condition, and with the control circuitry again responding to a power setting selected by an operator to separately actuate the individual bender elements and cause the actuated bender element to deflect and complete a circuit between the power source and the terminal means of the heating element operatively associated with the actuated bender element. A suitable method for operation of an individual heating element in any of the herein illustrated control embodiments thereby comprises (a) selecting a power setting for the heating element from a plurality of settings, (b) converting the selected power setting to control signals in a manner enabling actuation of a piezoceramic relay device with operatively associated control circuitry, and (c) utilizing the control signals to cause the bender member in said relay device to deflect and complete a circuit between the power source and the heating element. As can further be appreciated in connection with such method of regulating the heating element, any termination of actuating potential to the bender member causes deflection in the opposite direction so that the relay contacts open for a fail-safe manner of operation in the illustrated heating apparatus. As further above illustrated, such manner of operation can still further include opening of additional manually operated switch means when the power selector means 44 are turned to an "off" condition.

Figure 3:
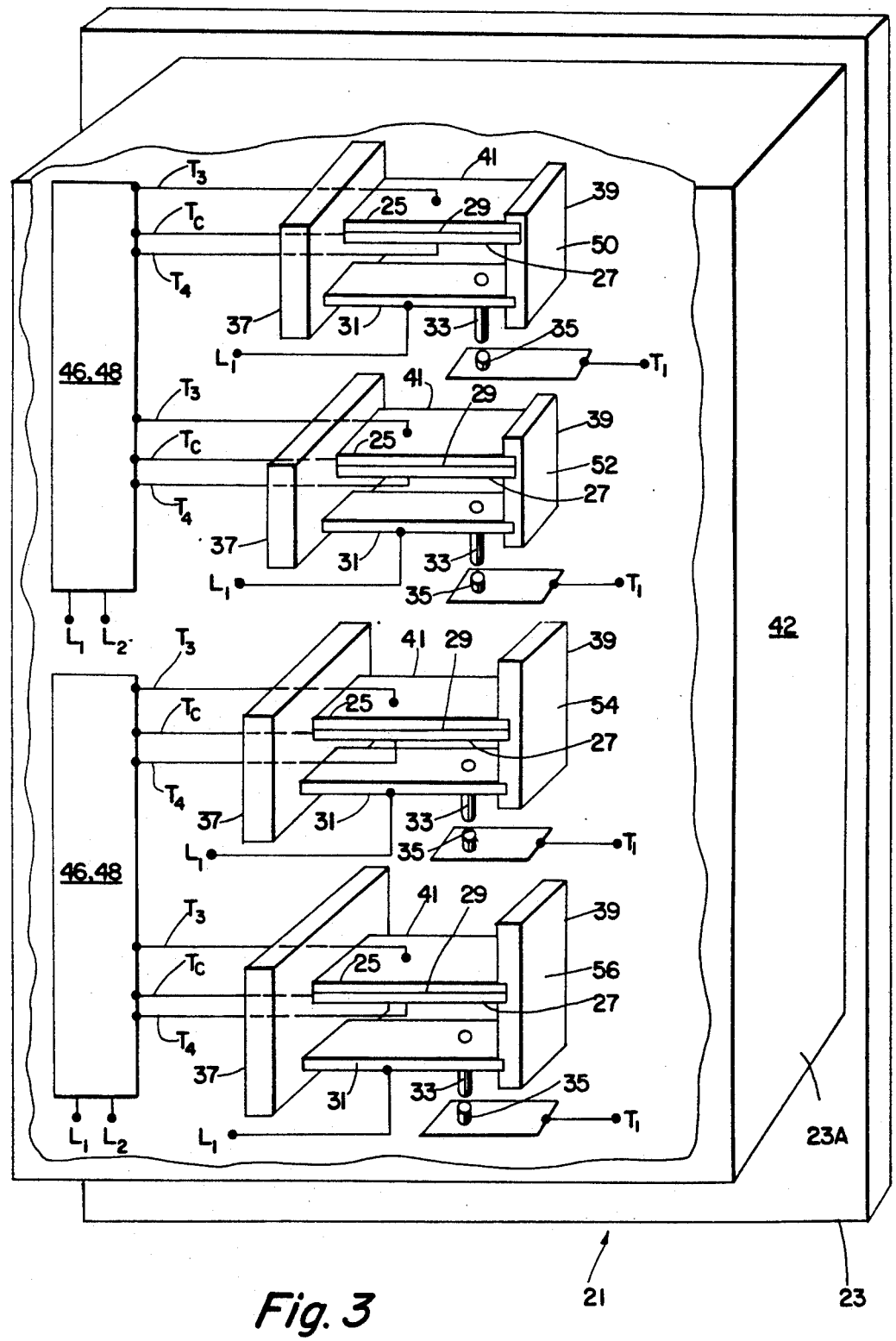
FIG. 3 is a more detailed structural view for a representative power switching means controlling the surface cooking mechanism in the FIG. 1 range embodiment.

In FIG. 3 there is depicted a more detailed structural view for the hereinbefore illustrative power control system 42 operating the surface heating mechanism 12 in the FIG. 1 range appliance. As further depicted by dashed lines in the FIG. 1 drawing, such control means 42 can all be physically incorporated into a single housing member or module which is mounted on the control panel 30 to regulate the power input to the controlled resistive heating elements 14, 16, 18 and 20. Accordingly, the series connected piezoceramic relay devices 50, 52, 54 and 56 controlling power input to the heating elements, respectively, are all housed within a boxlike enclosure 21 along with the terminal means enabling electrical connection to the respective heating elements. The box-like enclosure includes an electrically insulative base 23 which can be conveniently secured to the control panel 30 provided in the range appliance and further includes cover means 23A to protect the housed electrical components against atmospheric contamination. All piezoceramic devices 50, 52, 54 and 56 together with associated switching circuitry means 46 and 48 for this control embodiment are affixed to the insulative base member 23 as are the coacting electrical contact means in the relay devices. Common letter and numeral identifications have been employed to designate the same structural components in the individual relay devices as well as common terminals and contact means in the respective devices. Each piezoceramic relay device 50, 52, 54 and 56 comprises a pair of the piezoceramic plate elements 25 and 27 secured together in sandwich fashion on opposite sides of a central conductive surface 29. A further conductive spring element 31 physically cooperates with the individual relay devices by having both components clamped at one end to an electrically insulative block support 37 while also being joined at the opposite ends to another electrically insulative block member 39. As can be noted from the drawing, further electrical cooperation takes place between the joined components by having the coacting contact means 33 and 35 of each relay device disposed with respect to the movable bender portions 41 in the device so that upon deflection there occurs closure or engagement of the coacting contact means. Terminal means $T_3$, $T_4$ and common terminal $T_c$ provides the means whereby DC energizing potential is selectively and respectively provided across the prepolarized movable bender plate elements responsive to control signals provided with the associated switching circuitry 46 and 48 and which causes the movable bender portions 41 to deflect and close the movable contact elements 33 with the fixed electrical contact elements 35. Upon closing of each pair of the coacting contact means, an electrical circuit is completed between terminal $L_1$ which is connected to the power source and terminal $T_1$ which is connected to an individual heating element (not shown). Further terminal means are provided to an individual heating element outside the depicted control module whereby electrical connection is made to the other power conductor ($L_2$) for completion of the circuit enabling power to be applied to the heating elements as previously disclosed in connection with the FIG. 2 description. When the individual piezoceramic relay devices are not energized by reason of not having control signals being applied, the coacting contact means provided to the bender members remain spaced apart as further shown in the present drawing. The control circuitry 46 and 48 which provide control signals and DC energizing potential, respectively, to actuate the individual relay devices in the present control embodiment 42 are shown to be electrically connected in paired relationship with respect to the relay devices. More particularly, a pair of the relay devices can be separately actuated with the same solid state analog circuit means 46 and solid state switching circuit means 48 as disclosed in the preceding embodiment while the remaining pair of piezoceramic relay devices can also be separately actuated with duplicate circuit means of the same type. In doing so, it remains advisable in each of the analog circuit means being employed to derive control signals actuating a pair of the piezoceramic relay devices to derive control signals actuating one relay device with a reference voltage dissimilar with respect to a reference voltage employed to derive control signals for the other relay device, such as in the manner explained in the preceding embodiment, and thereby avoid simultaneous power application to the operatively associated heating elements. Accordingly, each of the analog circuit means 46 being employed to derive separate control signals to an interconnected pair of the piezoceramic relay devices 50, 52, 54 and 56 can employ the solid state CMOS quad comparator device and associated reference voltage circuit means disclosed in the preceding embodiment for this purpose. Similar circuit duplication can be employed (as depicted in the present drawing) in each solid state switching circuit means 48 separately providing DC energizing potential to an individual piezoceramic relay device. Thus, duplicate pairs of high voltage active devices can be employed in each of the solid state switching circuit means 48 which are connected in circuit relationship enabling connection of an individual piezoceramic relay device to each pair of the active devices as more fully explained hereinafter with respect to the illustrative embodiments for the circuit means being described in FIGS. 6–7.

It will be evident from the foregoing description pertaining to the illustrated control embodiment 42 that operation of the individual piezoceramic devices also takes place in the same manner previously explained in connection with the prior FIG. 2 description. The terminal means $L_1$ provides connection of each piezoceramic relay device to the power source while the movable piezoceramic bender 41 in each relay device includes movable electrical contact means 33 which coact with fixed electrical contact means 35 disposed thereby to provide connection to an operatively associated heating element having terminal means $T_1$. The control circuitry means 46 and 48 are also shown to be directly and ohmically connected to the power source via power conductors $L_1$ and $L_2$ as well as connected to the individual piezoceramic relay devices via terminals $T_3$, $T_4$ and common terminal $T_c$. It thereby again follows in such control embodiment that each heating element operatively associated with an individual piezoceramic relay device of the type herein employed responds to a power setting selected by an operator which causes the actuated bender member in the individual relay device to deflect and complete a circuit between the power source and the terminal means of the heating element. While not depicted in the present drawing but also evident from the prior description herein relating to further control means already employed in conventional electric range appliances to control the operating temperature of a heating element employed in the surface cooking mechanism, that temperature control means can also be incorporated into the present control embodiment. Thus, solid state feedback temperature control means in the form of a thermistor circuit will be more fully described hereinafter in connection with a representative power regulating system for such surface cooking mechanism in FIG. 6. A suitable method for operation of an individual heating element employing the combined power control and temperature control signals in such modification to the present control embodiment comprises the steps of (a) selecting a power setting for an individual heating element from a plurality of power settings, (b) converting the selected power setting to power control signals, (c) utilizing the power control signals to actuate a prepoled piezoceramic relay device with operatively associated control circuitry and cause the bender member in the relay device to deflect and complete a circuit between the power source and the heating element, (d) sensing temperature reached with the operating heating element to derive temperature control signals, and (3) terminating power input to the individual heating element when the sensed temperature reaches a predetermined temperature by causing the coacting contact means of the piezoceramic relay device to open. In this manner of operation, it will also be evident that additional manually operated switch means can be included to interrupt power being supplied to the heating element as previously mentioned.

Figure 4:
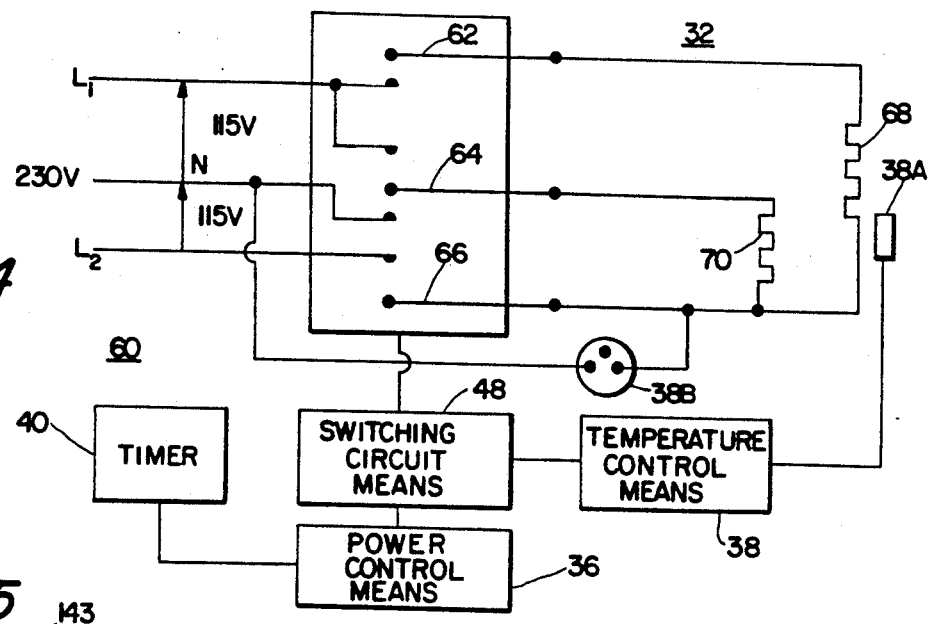
FIG. 4 is a functional block diagram for one aspect of the present control means as employed in the oven cooking mechanism of the FIG. 1 apparatus.

In FIG. 4 there is provided a functional block diagram depicting a typical power regulation system being employed in the oven cooking mechanism of the FIG. 1 range appliance. Accordingly, the depicted power regulation system 60 includes power supply conductors $L_1$ and $L_2$ along with neutral power conductor N. A 230 volt alternating current power supply is thereby provided together with a pair of 115 volt supply circuits. A switch for conventional timer means 40 enables completion of a circuit to a manually operated control knob 36 having internal switch contacts shown in the drawing to provide representative operating functions such as off, time bake, broil, bake and self-clean. Control knob 36 thereby permits an operator to select a power setting level for control of the oven cooking mechanism embodiment 32 in the same manner above described in connection with the previously described surface cooking mechanism. Another manually operated control knob 38 further enables the operator to select the cooking temperature to be reach in the oven compartment (not shown) when the operatively associated heating elements are being operated with temperature control signals as well as power control signals in accordance with the depicted representative control embodiment. Piezoceramic relays 62, 64, and 66 are further series connected as shown in the drawing to resistive heating elements 68 and 70. Relay devices 62 and 66 are each operated as on-off switches dependent upon the selected operating function whereby actuation causes the respective piezoceramic bender members to deflect and connect the operatively associated heating elements to the power conductors. Relay device 64 is operated as a three positioned switch, however, again dependent upon the selected operating function wherein actuation causes its piezoceramic bender member to either deflect upwards and connect the operatively associated heating element to power conductor $L_1$ or move downwards to connect this heating element to neutral conductor N. It can be further noted from the present drawing that controlling operation of the associated heating elements in the described manner enables separate operation of the individual heating elements during certain cooking functions while other functions are provided with both heating elements being simultaneously operated. Temperature control signals are derived in the illustrated embodiment with temperature sensing means 38A being provided in the oven compartment. A pilot light 38B has further been provided in the depicted oven cooking mechanism to illustrate another function customarily employed in the conventional range appliance. As previously mentioned, the control circuitry means 46 and 48 provided in the power regulation system 60 herein being described can be the same or similar in operation as that employed for operation of the individual heating elements in the above described surface heating mechanism embodiment. Accordingly, the individual heating elements and piezoceramic relay devices employed in the present embodiment can be provided with essentially the same terminal and circuit connections previously described in connection with the surface heating mechanism embodiment and with essentially the same circuit means therein employed providing the power control and temperature control signals to the present control circuitry means 36 and 48. To still further illustrate one suitable power regulation system for the present oven cooking mechanism embodiment which can be provided in this manner, however, the individual piezoceramic relay devices are connected in circuit relationship to enable independent connection of the power source to an individual heating element, each of the piezoceramic relay devices including terminal means for connection to the power source and a movable prepoled piezoceramic bender member having movable contact means which coact with fixed contact means to connect with terminal elements of one heating element, and with the piezoceramic relay devices being separately actuated with control circuitry directly and ohmically connected to the power source and the terminal means of each piezoceramic relay device to respond to a power setting selected by the operator as well as temperature control signals causing the actuated individual bender members to deflect and complete a circuit between the power source and the terminal means of the heating element operatively associated with the actuated bender member, the control circuitry providing the DC energizing potential for such separate actuation of the individual relay devices with interconnected analog circuit means deriving the control signals. Again, it follows that operation of such representative oven cooking mechanism entails the steps of (a) selecting a power setting for the individual heating elements from a plurality of power settings provided in the power control means 36, (b) converting the selected power setting to power control signals in the power control means 36, (c) utilizing the power control signals to actuate one or more prepoled piezoceramic relay devices with the operatively associated switching circuit means 48 and cause the actuated bender member to deflect and complete a circuit between the power source and operatively associated heating elements, (d) sensing temperature reached with the operating heating elements to derive temperature control signals in the further operatively associated temperature control means 38, and (e) terminating power input to the heating elements when the sensed temperature reaches a predetermined temperature with the temperature control means.

Figure 5:
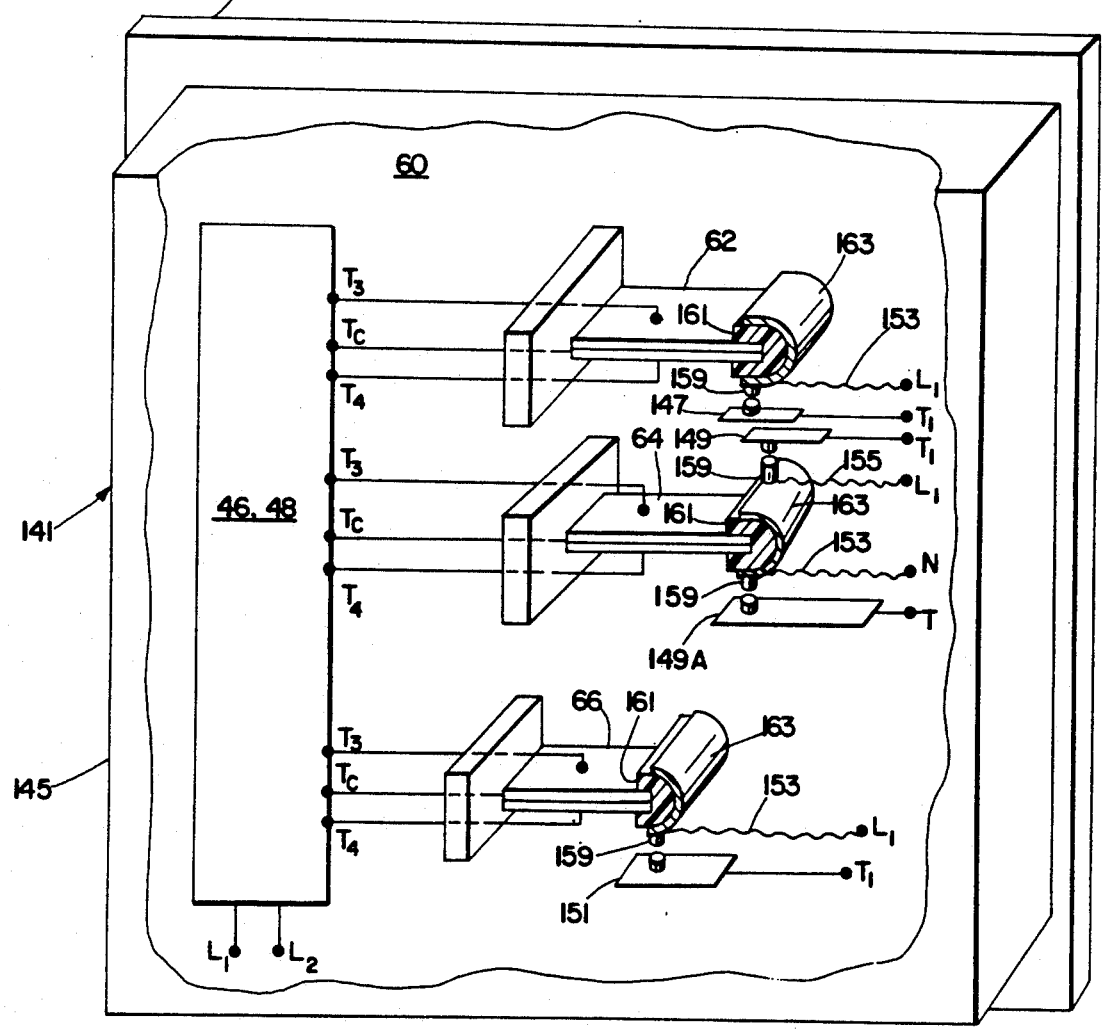
FIG. 5 is a more detailed structural view of a representative power switching means controlling the oven cooking mechanism in the FIG. 1 range appliance.

In FIG. 5 there is depicted a more detailed structural view partially in cross section for a typical power control module 60 operating the oven cooking mechanism described in the immediately preceding embodiment. As previously indicated with the control means in FIG. 3 all electrical components for the depicted control embodiment can be physically incorporated within a single housing member. Accordingly, the series connected piezoceramic relay devices 62, 64 and 66 regulating power input to the controlled resistive heating elements 68 and 70 (not shown) are all housed within a box-like enclosure 141 along with the terminal means enabling electrical connection to the heating elements. The box-like enclosure includes an electrically insulative base 143 which again can be conveniently secured to the control panel 30 provided in the range appliance 10 and further includes cover means 145 to protect the housed electrical components against atmospheric contamination. All piezoceramic relay devices 62, 64 and 66 along with the associated switching means 46 and 48 are affixed to the insulative base member 143 as are the fixed electrical contact means 147, 149, 149A and 151 coacting in the relay devices. As can be noted in the present drawing, common letter and numeral identification are again employed to designate the same structural components in the individual relay devices as well as common terminals and control means in the respective devices. In the latter regard, however, it should be noted that flexible lead conductors 153 and 155 (which are also commonly termed "flying leads") connect the relay devices to the power conductor $L_1$ since the particular relay embodiments employed herein lack electrical contact between the movable contact means and the bender members as more fully explained in connection with FIG. 9.

Each piezoceramic relay device 62, 64 and 66 is of the "bimorph" type previously described, however, and wherein DC energizing potential is applied to each relay device with the operatively associated control circuitry 46 and 48 in the same manner via terminals $T_3$, $T_4$ and common terminal $T_c$. As distinct from the previously described piezoceramic relay embodiments, however, the movable contact means 159 secured to the respective benders are electrically insulated from the outer conductive surfaces with insulative elements 161 while still being electrically connected with flexible conductors 153 and 155 to $L_1$ or N power conductors. Electrically conductive elements 163 secured to the electrically insulative elements 161 facilitate connection of the flexible conductors 153 and 155 to the movable contact means 159. In such manner, connection of the piezoceramic relays 62 and 66 to the power source via the flexible conductors takes place and with further connection between the power source and the terminal means of the associated heating element being provided when the coacting contact means 147, 159 or 151, 159, respectively, are closed responsive to the control signals actuating the respective bender members. In a similar manner, the pairs of coacting contact means 149, 159 and 149A, 159 provided to piezoceramic relay device 64 respond to the control signals such that upward deflection of the bender member connects the associated heating element to power conductor $L_1$ whereas downward deflection of the bender member connects the associated heating element to the neutral (N) power conductor. As further depicted by the dashed lines in the FIG. 1 drawing, the representative control module 60 can conveniently be mounted on the control panel 30.

Figure 6:
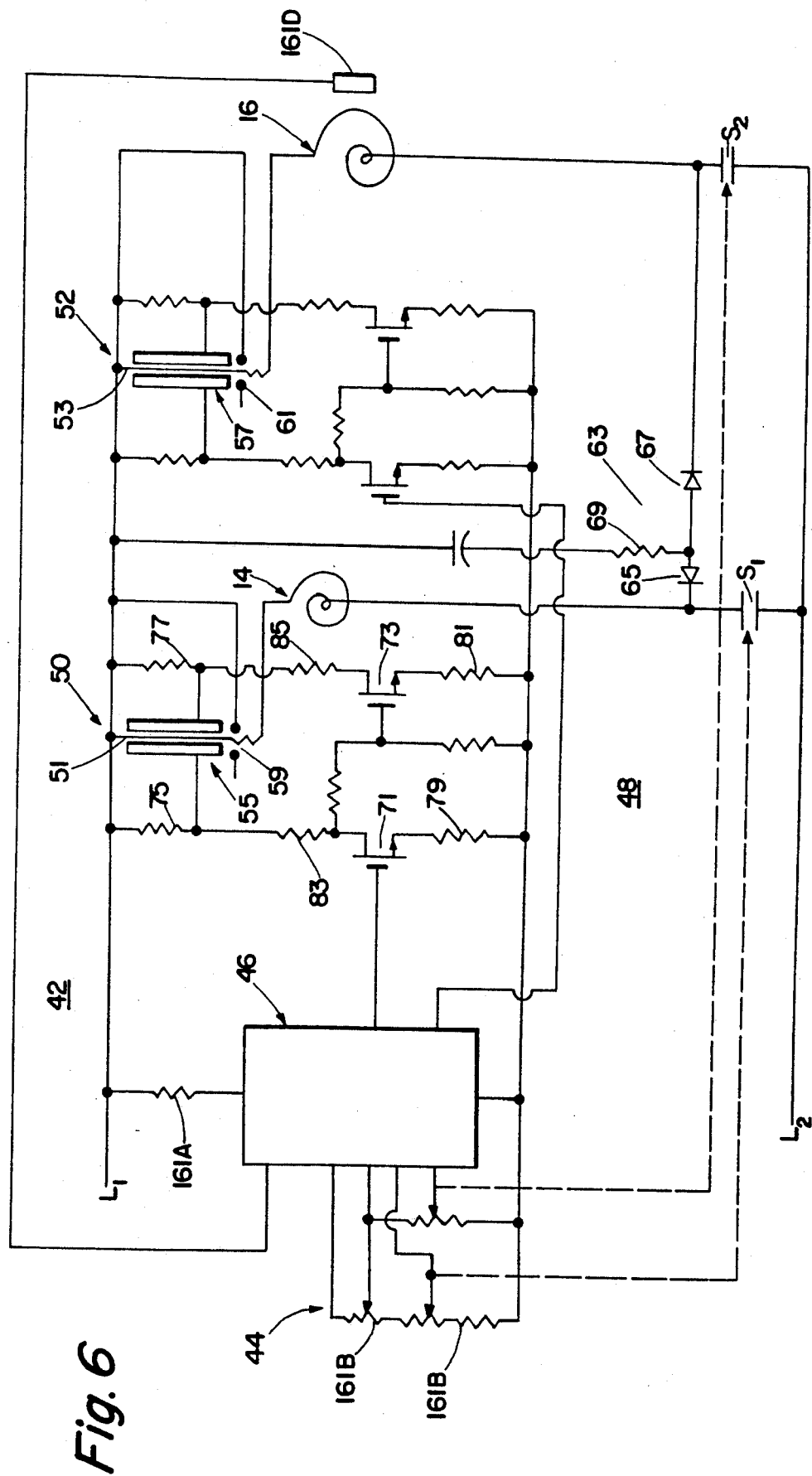
FIG. 6 is an electrical schematic diagram for a representative control circuit which can be employed in the surface cooking mechanism of the FIG. 1 apparatus.

FIG. 6 is an electrical schematic diagram representing one type control circuitry 42 which can be employed to operate individual resistive heating elements in the surface cooking mechanism embodiment of the FIG. 1 apparatus. For greater ease of understanding, the same numerals have been retained in the present Figure to identify the same circuit components previously identified for the block diagram control system in FIG. 2. As can be noted in the present drawing, a pair of the piezoceramic relay devices 50 and 52 are each connected in circuit relationship so that the respective central conducting surfaces 51 and 53 are connected to one power conductor $L_1$ with the movable piezoceramic bender ends 55 and 57, respectively, remaining in the central open position while the relay devices remain unenergized. Pairs of fixed electrical contacts 59 and 61, respectively, coact with movable contacts disposed on the movable bender ends to enable completion of an electrical circuit between the power supply and the further operatively connected resistive heating elements 14 and 16. As can further be appreciated in such circuit relationship, the relay device interconnection provides a mechanical interlock such that the control means can never initiate simultaneous operation of the individual resistive heating while the relay devices require very little holding power during operation, such as about ten microwatts. The depicted drive circuit means 48 supplying DC energizing potential to the individual piezoceramic relay devices further employs a resistor-diode network having associated safety switches $S_1$ and $S_2$ as an additional precaution in averting simultaneous actuation of these relay devices. The resistor-diode network 63 employs diodes 65 and 67 with further connected resistor 69 to achieve this objective. The relay drive portion in the control circuitry for relay device 50 is carried out with a pair of active devices 71 and 73 shown as discrete output transistors. Control signals enabling automated actuation of the piezoceramic relay devices in the circuitry are provided with customized high voltage analog integrated circuit device 46 in a general manner as previously explained. Thus, power selector means 44 derives control signals for independent operation of the interconnected heating elements responsive to power setting levels selected by an operator with manual control knobs (not shown). The variable DC control voltages are then applied to the analog circuit means 46 for automated signal processing. Energizing the piezoceramic relay device with simple single transistor drive means in the present automated control circuitry further employs passive resistor pull-ups 75 and 77 to discharge the piezoceramic plate elements whenever selective energization is terminated. On initial energization the high voltage electronic control means turns on to approximately three volts so that series connected active drive transistor 71 and resistor 79 operate as a control current source. On initial closure of the further connected relay contacts, the voltage being applied on the gate of the active device 71 is thereupon immediately raised to the full bus voltage provided from the electronic control circuit means which may be as high as ten volts. This then turns active device 71 full on and the piezoceramic relay plate element being so operated is thereupon rapidly charged, increasing the contact force of the relay contacts and preventing a weld upon further contact closure. Similar operation of the remaining active device 73 and its series connected resistor 81 is provided by the electronic control circuit means. Further current limiting resistors 83 and 85 series connected to active devices 71 and 73, respectively, prevent excess currents in the active devices that turn on as well as participating in limiting the maximum rate of closure of the respective piezoceramic relay contacts. Since operation of the remaining piezoceramic relay device 52 regulating power input to resistive heating element 16 with the present automated control circuitry occurs in the same manner, only the circuit elements required for this control means have been further depicted in the drawing.

It will be recognized by reason of the preceding descriptions appearing herein with respect to the FIGS. 2-3 circuit embodiments, that a solid state thermistor circuit can optionally be incorporated into the present analog circuit means 46 to provide feedback temperature control with respect to operation of either of the depicted heating elements 14 and 16. In doing so, additional resistor elements 161A, 161B and 161C are included in the depicted circuit embodiment along with a solid state thermistor sensing element 161D being placed in close physical proximity to the heating element desired to be controlled as also shown in the present drawing. It can be further recognized from the preceding FIGS. 2-3 description that various physical configurations for a piezoceramic relay device can be employed to complete a circuit between the power source and the associated heating element in the depicted circuit embodiment. Since a circuit is completed in the embodiment with deflection of the piezoceramic bender member in a single direction, the particular relay devices specifically described in the FIG. 3 circuit embodiment can serve this purpose. On the other hand, by a relatively simple modification made in the present circuit embodiment, it becomes thereby possible to replace the individual relay devices 50 and 52 being employed therein with a single relay device having the bifurcated construction previously described in connection with the FIG. 2 circuit embodiments. It can also be appreciated in connection with the description provided above upon the present circuit embodiments, that remaining heating elements 18 and 20 in the surface cooking mechanism embodiment originally described can be operated in the same manner. In all the foregoing variations for the present control embodiment, however, the operation of the individual heating elements remains essentially the same as previously described. Thus, a suitable method for operation of an individual heating element in the present control embodiment employing both power and temperature control signals comprises the steps of (a) selecting a power setting for the individual heating element from a plurality of power settings provided with the power selector means 44, (b) converting the selected power setting to power control means in the associated analog circuit means 46, (c) utilizing the power control signals to actuate a prepoled piezoceramic relay device with the drive circuit means 48 thereby causing the actuated bender member to deflect and complete a circuit between the power source and the actuated bender member, (d) sensing temperatures reached with the operating heating element to derive temperature control signals with the solid state thermistor circuit provided, and (e) terminating power input to the operating heating element when the sensed temperature reaches a predetermined temperature by causing the coacting contact means of the actuated bender member to open.

Figure 7:
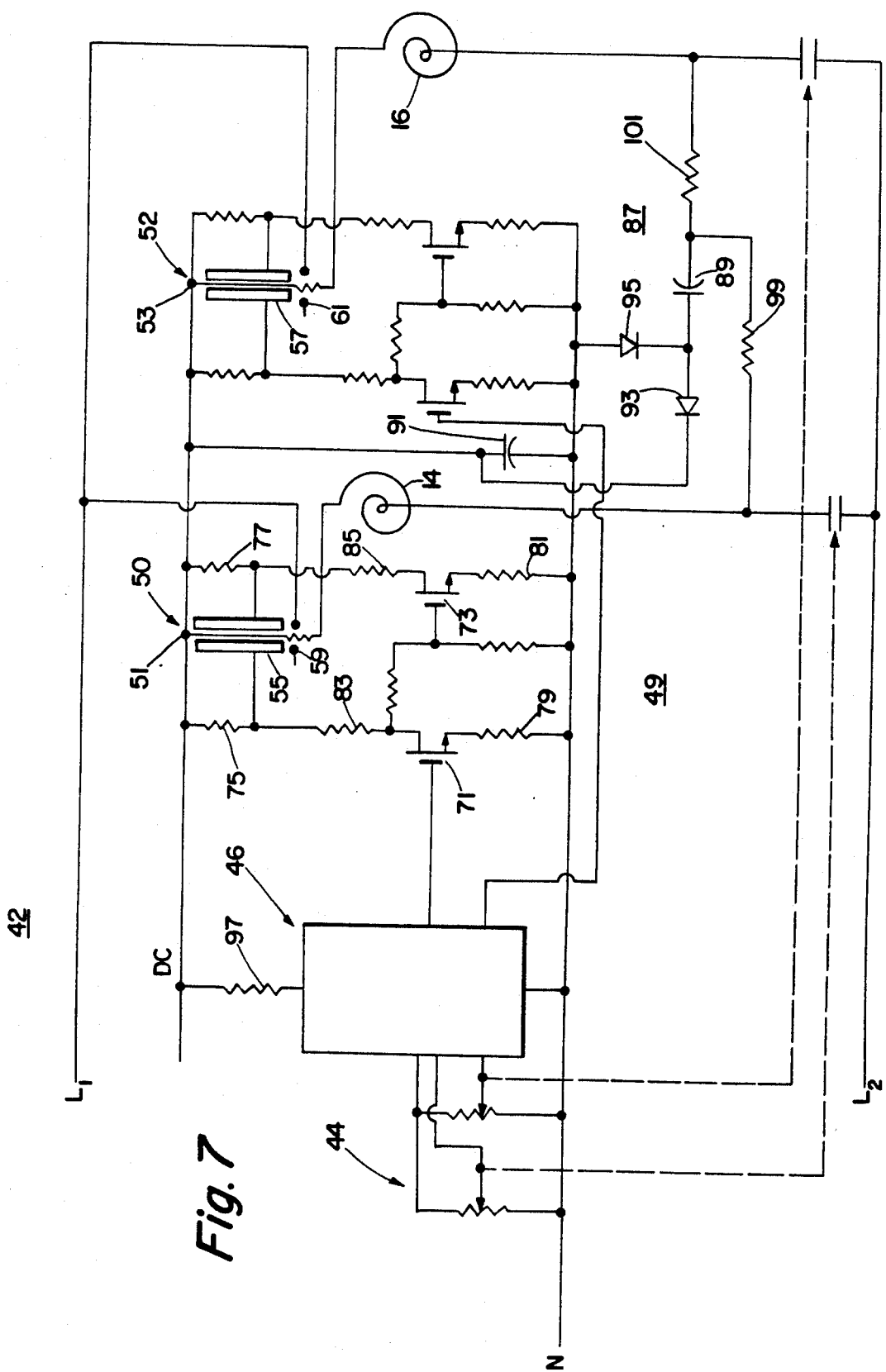
FIG. 7 is an electrical schematic diagram for a different control circuit which can be used in the surface cooking mechanism of the FIG. 1 apparatus.

FIG. 7 is an electrical circuit diagram depicting alternate circuit means for the automated control circuitry above described in FIG. 6. More particularly, whereas the FIG. 6 circuitry supplies a ½ wave supply to the controlled resistive heating element from an available 230 volt alternating current power source, the presently described control circuitry enables operation of the load devices with a 115 volt power supply as derived from the 230 volt power source. Accordingly, the same numerals employed in FIG. 6 are herein retained to identify common circuit components in the present automated control circuitry. With respect to comparable operation of the common circuit elements in the present control circuit embodiment 42 there also needs to be no repetition of the FIG. 6 circuit description. The present control description is thereby limited to describing additional circuit components required to double the 115 volt supply being provided from the power source in order to provide a higher DC energizing potential to the individual piezoceramic relay devices 50 and 52 connected in the present control circuit means 48. Accordingly, there is depicted a diode-capacitor network 87 which doubles the supply voltage to both connected piezoceramic relay devices 50 and 52 in an otherwise known manner. The diode-capacitor network 87 is represented by a pump capacitor 89, storage capacitor 91 and doubling diodes 93 and 95 which supplies the DC energizing potential actuating both relay devices as shown. Current limiting resistors 97, 99 and 101 are included in the control circuitry to reduce susceptibility of the circuit to line-induced transients.

Figure 8:
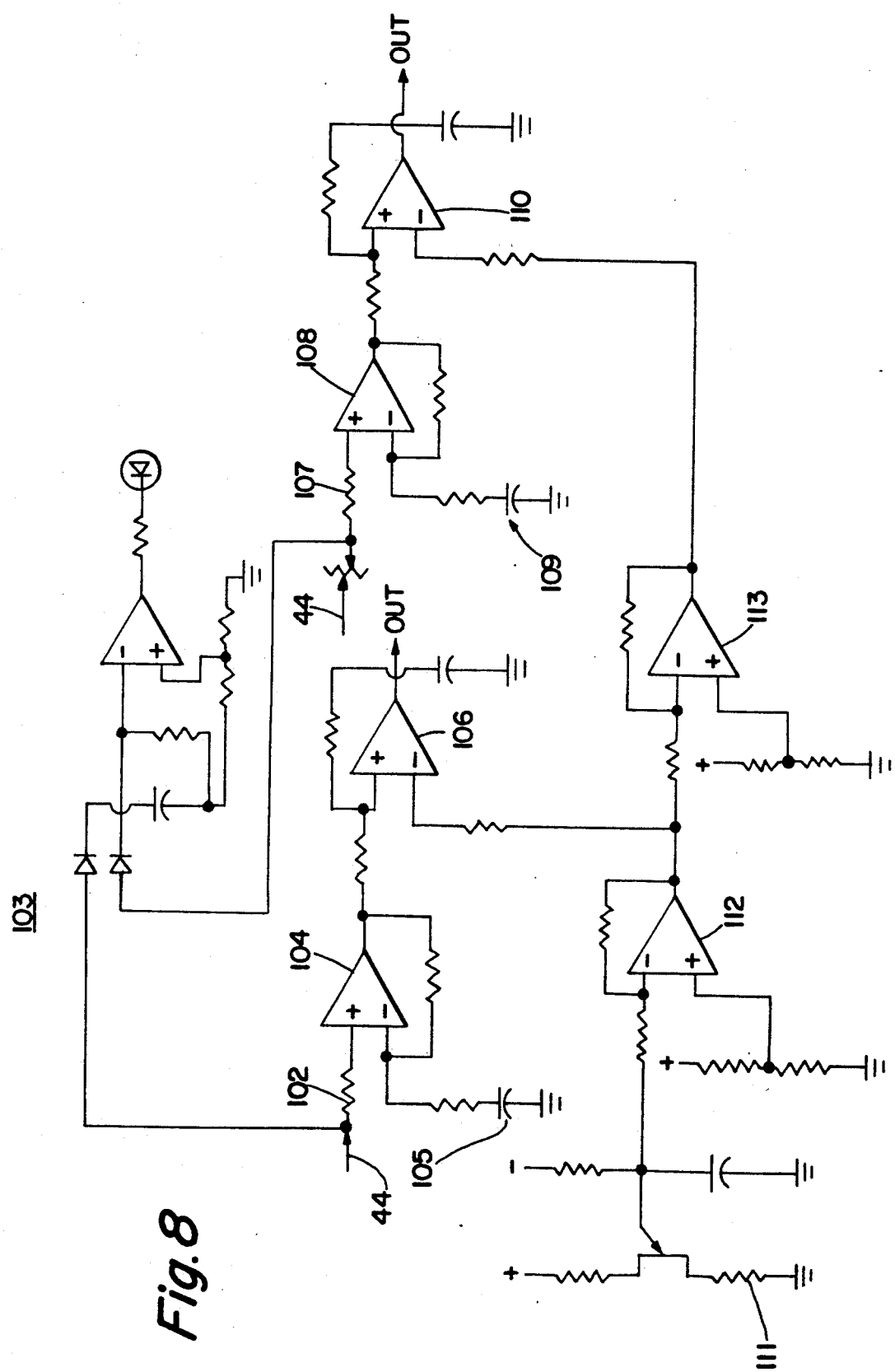
FIG. 8 is an electrical schematic diagram for typical solid state analog circuit means which can be employed in the control circuitry of FIGS. 6-7.

FIG. 8 is an electrical schematic diagram for the analog circuit means 46 employed in the control circuitry of FIGS. 6-7. As therein disclosed, a customized analog integrated circuit device 103 is provided having four comparator type amplifier means 104, 106, 108 and 110. Input voltage signals obtained from the power selector means 44 (not shown) are applied to the quad comparator network 103 to produce the desired control signals by automated signal processing. More particularly, the DC voltage signals representing the power settings selected by an operator are applied through resistor 102 to first amplifier means 104 for comparison to a feedback voltage obtained by modifying its output voltage to charge associated capacitor 105. The first amplifier output voltage is next applied to second amplifier means 106 for comparison with a sawtooth reference voltage, the output voltage from the second amplifier 106 providing control signals to both active devices controlling the operation of a single piezoceramic relay device in the relay drive circuitry (either 48 or 49). In a like manner, second control signals representing power settings selected by an operator for the remaining resistive heating element illustrated in the control circuitry are automatically processed in the depicted analog circuit means. Specifically, the input DC voltage signals are applied to first amplifier means 108 through resistor 107 for comparison with the feedback control voltage obtained by modifying its output voltage to charge associated capacitor means 109. The first amplifier output voltage is thereupon applied to second amplifier means 110 for comparison with a second sawtooth reference voltage having an inverse relationship with respect to the previously employed sawtooth reference voltage. The processed voltage signals obtained from second amplifier means 110 provides control signals for application to both active devices controlling operation of the remaining piezoceramic relay device depicted in the control circuitry of FIGS. 6-7. The aforementioned sawtooth reference voltages hereinbeing employed are also derived automatically in the present analog circuit means. A unijunction relaxation oscillator circuit component 111 generates the sawtooth wave form which is then applied to operatively associated operational and buffer amplifier means 112 and 113. The output wave form from amplifier means 112 becomes a reference signal for comparison in amplifier means 106 while also being applied to amplifier means 113 wherein a polarity reversal takes place. The output waveform from amplifier means 113 becomes the reference signal for comparison to amplifier means 110.

Figure 9A:
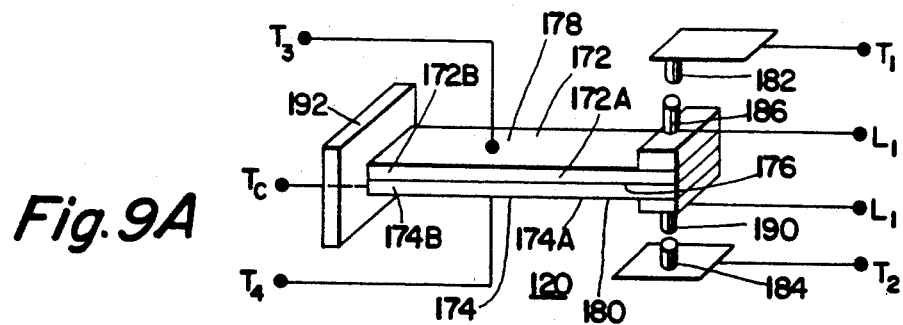
FIG. 9 comprises longitudinal side views for three representative piezoceramic bimorph type relay devices which can be used in the present control means.
Figure 9B:
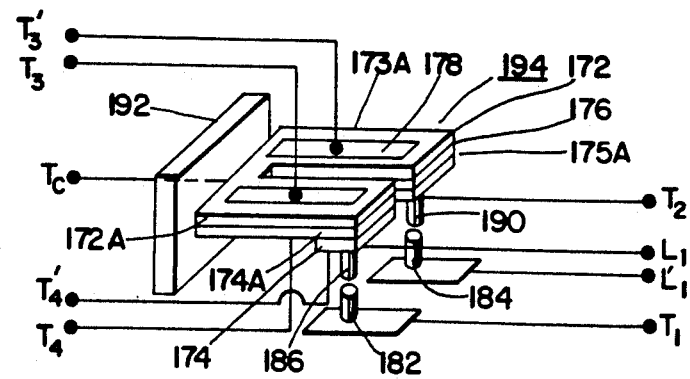
Figure 9C:
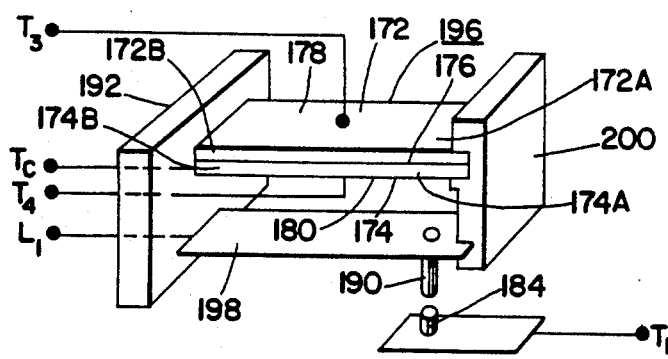

FIGS. 9A, 9B and 9C provide longitudinal side views of three different constructions for a piezoceramic bimorph type relay device which can be used in the present control means. The relay device in FIG. 9A enables long term reliable operation in the manner previously described in connection with FIGS. 2 and 4 wherein power can be switched between a pair of the heating elements in the surface and oven cooking mechanisms of an illustrated range appliance with a single relay. The relay device shown in FIG. 9B represents a different structural form enabling power to be supplied to a pair of heating elements in various electric heating apparatus upon deflection of separate bender elements in the same direction. The relay device in FIG. 9C depicts a still different structural embodiment having remotely disposed movable contact means operatively associated with a single bender element as well as remote terminal means for connection to the power source. The latter device is also suitable for supplying power to an individual heating element in various types of electric heating apparatus with individual relays being required to supply power to each heating element. All of the depicted embodiments are operated in a similar manner with the present control circuitry, however, in that a movable bender member is caused to deflect responsive to the control signals and complete a circuit between the power source and terminal means separately connected to the actuated bender member in the controlled apparatus. For this reason, the same letter and numeral identifications are employed in the present drawing to designate common structural elements in the respective relay embodiments as well as common terminal connections in so far as possible.

In FIG. 9A, the piezoceramic bender type switching device 120 is formed by having at least two planar piezoceramic plate elements formed by an upper plate 172 and a lower plate 174 as seen in the drawing. The piezoceramic plate elements 172 and 174 are secured in opposed parallel relationship sandwich fashion on opposite sides of at least one central conductive surface 176 and having respective outer conductive surfaces 178 and 180 that are insulated from each other and the central conductive surface 176 by the respective intervening piezoceramic plate element thicknesses. The piezoceramic plate elements 172 and 174 may be formed from lead zirconate titanate, lead metaniobate barium titanate or other known piezoceramic materials. The conductive surfaces 176, 178 and 180 may be formed with nickel, silver or other like conductive materials deposited on or otherwise secured to the plate elements 172 and 174. The bender-type switching device further includes one set of coacting fixed electrical switch contacts 182 and 184 mounted on relatively rigid support means and which may be sufficiently flexible to absorb impact and closed by deflection of a prepolarized movable bender portion comprised by the piezoceramic plate elements 172A and 174A of the bender type switching device. The contacts 182 and 184 coact respectively with electrically insulated contacts 186 and 190 formed on the movable end of the bender device 172, 174 when actuated by control signals provided in accordance with the present control means. The movable bender portions 172, 174 of the piezoceramic switching device 120 are physically supported in a cantilever manner by clamping means shown at 192 which serves to both physically hold and clamp together the piezoceramic plate elements 172 and 174 with the central conductive surface 176 being sandwiched therebetween. Clamping means 192 is disposed over portions 172B and 174B of the piezoceramic plate elements 172 and 174 which have not been prepolarized and therefore are unpoled and electrically neutral as opposed to the prepolarized active movable bender portions 172A and 174A of the plate elements on which the contacts 186 and 190 are provided. Preferably the clamping means 192 is disposed over the ends of the non-polarized or unpoled portions 172B and 174B which are immediately adjacent to and physically integrated with the ends of the prepolarized active movable bender portion comprised by plate element portions 172A and 174A which have been prepolarized. It has been discovered that by mounting the piezoceramic plate elements in this manner, the number of failures due to fracturing the ceramic material at their support points is greatly reduced. Terminal means $T_3$, $T_4$ and common terminal $T_c$ provide the means whereby DC energizing potential is selectively and respectively applied across the prepolarized active movable bender plate portions 172A and 174A responsive to control signals provided with the present control circuitry (not shown). Such energizing potential also being applied with the control circuitry causes the movable bender portion to selectively deflect and close their contacts 186 and 190 on either of the coacting fixed contacts 182 and 184, respectively. Upon the closing of one pair of coacting contacts, an electrical circuit is completed between terminals $L_1$ which are connected to the power source, and either of the further terminals $T_1$ and $T_2$ which are separately connected to terminal means of the operatively associated heating elements in the controlled apparatus. Accordingly, an upward deflection of the bender member completes an electrical circuit between the power source and terminal $T_1$ whereas a downward deflection of the bender member completes a similar circuit to terminal $T_2$. Upon removal of the DC energizing potential to either terminal $T_3$ or $T_4$, the active movable bender portion returns to its center neutral unenergized position thereby opening whichever set of coacting contacts 182, 186 or 184, 190 has been closed.

The piezoceramic bender type switching device 194 being depicted in FIG. 9B has a general structural configuration similar to the above described relay embodiment hence the same letter and numeral identification has been retained to designate common structural elements in the present relay device. The present device is dissimilar in having a pair of bifurcated movable bender portions 172A, 174A and 173A, 175A which are separately actuated for completion of electrical circuits to terminals $T_1$ and $T_2$. In so doing, the movable contacts 186 and 190 are secured on the same side of the individual movable bender portions 172A, 174A and 173A, 175A, respectively, to enable the desired independent operation of the operatively associated heating elements. Separate terminal means are also provided to the individual movable bender portions whereby DC energizing potential can be individually applied across the ceramic plate elements of each movable bender portion along with separate terminal means provided for completion of individual circuits between the power source and one of the controlled mechanisms. Accordingly, terminal means $T_3$, $T_4$ and common terminal $T_c$ provide the means whereby DC energizing potential is selectively and respectively applied across the prepolarized active movable bender plate portions 172A and 174A in response to the control signals whereas terminals $T_3'$, $T_4'$ and common terminal $T_c$ provide corresponding means for the movable bender plate portions 173A and 175A. Upon closing of coacting contact pair 182, 186, an electrical circuit is completed between terminal $L_1$, which is connected to the power source, and terminal $T_1$, which is connected to terminal means of the associated heating element. In a similar manner, the closing of coacting contact pair 184, 190 completes an electrical circuit between terminal $L_1'$, which is also connected to the power source, and terminal $T_2$, which is connected to a different heating element. As can be further noted in the drawing, both electrical circuits are completed with a downward deflection of the bifurcated movable bender portions and with the movable bender portions maintaining the coacting contact means spaced apart while in an unenergized condition. Both control signals and energizing potential enabling separate actuation of the individual movable bender portions are again provided with the present control circuitry (not shown).

The piezoceramic bender type switching device 196 depicted in the FIG. 9C also has a general structural configuration similar to the FIG. 9A embodiment so that once again the same letter and numeral identification is retained in the present drawing to designate the common structural elements. As can be noted from the present drawing, however, the employment of a single pair of coacting contact means in this relay embodiment enables power to be applied but to a single heating element. Accordingly, the piezoceramic plate element 172 and 174 are secured in opposed parallel relationship sandwhich fashion on opposite sides of at least one central conductive surface 176 and having respective outer conductive surfaces 178 and 180 that are insulated from each other and the central conductive surface 176 by the respective intervening plate element thicknesses. The bender-type switching device further includes one pair of the coacting contact means 184, 190 which are closed by downward deflection of a prepolarized movable bender portion comprised by piezoceramic plate elements 172A and 174A of the bender-type switching device. In this regard, however, it can be noted that movable contact element 190 is disposed upon an electrically conductive spring element 198 and with both the movable bender portion and the spring element being joined together with an insulating block element 200 for common movement. By further electrically connecting the spring element 198 to the power source as shown in the present drawing, no further need arises to connect the movable contact with a flexible wire conductor or "flying lead" as employed in the preceding embodiments. The movable bender portions 172, 174 of the piezoceramic switching device 196 together with the spring element 198 are physically supported at the opposite ends in a cantilever manner by the clamping means shown at 192 and which again serves to both physically hold and clamp together the piezoceramic plate elements 172 and 174 with the central conductive surface 176 being sandwiched therebetween. The clamping means 192 is disposed over portions 172B and 174B of the piezoceramic plate elements 172 and 174 which are not prepolarized and therefore unpoled and electrically neutral as opposed to the prepolarized active movable bender portions 172A and 174A of the plate elements. Again, the terminal means $T_c$, $T_4$ and common terminal $T_c$ provide the means to supply DC energizing potential across the prepolarized active movable bender plate portions 172A and 174A in response to the control signals and which is all supplied with the present control circuitry (not shown). Upon closing the pair of coacting contacts 184, 190 responsive to the control signals it can again be noted that an electrical circuit is completed between the power source connected to the spring element 198 at terminal $L_1$ and the associated heating element connected to terminal $T_1$. It will be further apparent in the embodiment that removing the DC energizing potential to either terminal $T_3$ or $T_4$ causes the active movable bender portion to open the coacting contact pair and which remain spaced apart while the member is in an unenergized condition. It will be further apparent to one skilled in the art that similar individual regulation of power input to a second heating element in the heating apparatus can be provided with a second piezoceramic bender type switching device having the same construction and likewise series connected as herein shown to the second heating element in the apparatus.

Figure 10:
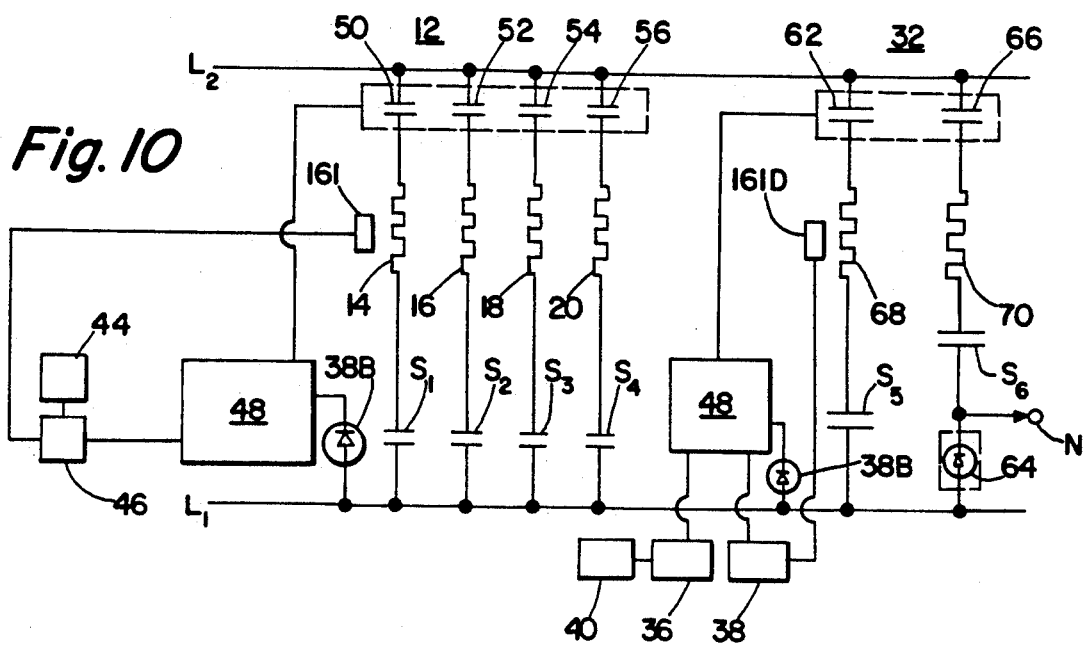
FIG. 10 is a functional schematic diagram depicting a representative embodiment of the present control means as employed in the FIG. 1 range appliance.

FIG. 10 is a functional schematic diagram depicting a representative power regulation system in connection with the household electric range previously described in FIGS. 1–8. The same numeral and letter identifications employed in the previous descriptions are retained to designate common or similar circuit components in the present embodiment. Accordingly, range appliance 10 employs a surface cooking mechanism 12 having four resistive heating elements 14, 16, 18 and 20 each having piezoceramic relay devices 50, 52, 54 and 56, respectively, individually connected in series to the respective heating elements. Also connected in series to the individual heating elements are manually operated normally open air-gap switch means $S_1$, $S_2$, $S_3$ and $S_4$ so that UL requirements are satisfied by having both power conductors $L_1$ and $L_2$ interrupted with an air-gap when the individual heating elements are not being operated. Power selector means 44 provides power control signals for individual operation of the heating elements in the surface cooking mechanism which are further processed by interconnected analog or digital circuit means 46 to regulate the percentage of time power is applied to the individual heating elements during operation. The processed power control signals are applied to the further interconnected switching circuit means 48 for individual actuation of the operatively associated piezoceramic relay devices. Actuation of the relay devices is provided with DC energizing potential generated by the switching circuit means which causes the actuated bender member of a relay device to deflect for consequent electrical connection of the power source to the heating element operatively associated with the actuated bender member. Individual actuation of the relay device 50, 52, 54 and 56 in this manner is depicted in the present drawing with dashed lines and with the relay devices also being shown to maintain an air-gap between the contact means when in an unenergized condition. A temperature sensing element 161D is also depicted in the present surface cooking mechanism embodiment to illustrate temperature control means being provided to a representative heating element 14 although like or similar control means can be employed in connection with the remaining heating elements. The temperature sensing element 161D provides signals to the analog or digital circuit means 46 enabling automated temperature control signals also derived therein to be applied to the switching circuit means 48 and with consequent actuation of the operatively associated piezoceramic relay devices being controlled in this manner. As hereinbefore pointed out, employment of a solid state temperature control means in the illustrated control circuitry provides a more precise temperature control with a continuous feedback signal over much if not all of the desired operating temperature range in the illustrated surface cooking mechanism embodiment. A pilot light 38B is also depicted for use in the illustrated surface cooking mechanism embodiment as a means of informing the operator whenever any of the controlled heating elements are being operated.

An oven cooking mechanism 32 is also employed in the household range appliance being depicted which utilizes a pair of resistive heating elements 68 and 70. Relay devices 62 and 66 are series connected to the heating elements, respectively, while a third relay device 64 enables connection to the neutral (N) power conductor, all in the manner previously described in connection with the FIG. 4 circuit embodiment. Normally open manually operated air-gap switch means $S_5$ and $S_6$ are also series connected to the resistive heating elements thereby again satisfying the UL requirements in the domestic appliance. Timer means 40 enables completion of a circuit to manually operated control means 36 which further includes internal switch contacts for selection of representative operating functions in the oven cooking mechanism such as off, time bake, broil, self-clean and bake. The control means 36 permits an operator to select a power setting whereby the percentage of time during which these heating elements are supplied with power is again regulated. Another manually operated control means 38 enables the operator to select the cooking temperature in the oven compartment when the heating elements are being operated with associated temperature sensing means 161D. Accordingly, both power control and temperature control signals are derived in such manner and provided to the further interconnected switching means 48, the circuit means again providing individual actuation of the operatively associated relay devices 62, 64 and 66 in substantially the same manner as above described in connection with the present surface cooking mechanism embodiment. Such individual actuation of the relay devices 62, 64 and 66 in the present oven cooking mechanism embodiment is depicted by dashed lines and with all the relay devices also being shown to maintain the air-gap spacing when not being energized. A pilot light 38B is also provided in the present oven cooking mechanism embodiment to inform an operator of the oven heating elements being operated.

Operation of the above described electric range embodiment thereby entails the steps of (a) selecting a power setting for an individual heating element in the surface cooking mechanism from a plurality of power settings, (b) converting the selected power setting for the individual heating element in the surface cooking mechanism to first power control signals, (c) utilizing the first power control signals for the individual heating element in the surface cooking mechanism to actuate a first prepoled piezoceramic relay device to complete a circuit between the power source and the individual heating element in the surface cooking mechanism, (d) sensing temperature achieved with the operating heating element in the surface cooking mechanism to derive first temperature control signals, (e) terminating power input to the individual heating element in the surface cooking mechanism when the sensed temperature reaches a predetermined temperature by causing the coasting contact means of the first piezoceramic relay device to open with the first temperature control signals, (f) selecting a power setting for an individual heating element in the oven cooking mechanism from a plurality of power settings, (g) converting the selected power setting for the individual heating element in the oven cooking mechanism to second power control signals, (h) utilizing the second power control signals to actuate a second prepoled piezoceramic relay device to complete a circuit between the power source and the individual heating element in the oven cooking mechanism, (i) sensing temperature achieved with the operating heating element in the oven cooking mechanism to derive second temperature control signals, and (j) terminating power input to the individual heating element in the oven cooking mechanism when the sensed temperature reaches a predetermined temperature by causing the coacting contact means of the second piezoceramic relay device to open with the second temperature control signals.

It will be apparent from the foregoing description that a broadly useful power regulation system has been disclosed which enable more efficient operation of an electric heating apparatus. It will also be apparent that modifications can be made in the specific methods, control means and controlled apparatus as herein disclosed without departing from the spirit and scope of the present invention. For example, it is recognized that still further control functions than above specifically disclosed can readily be programmed into the solid state automated circuit means herein described for modified operation of the heating mechanisms. Likewise, it is contemplated that the analog circuit means herein disclosed can be replaced with digital integrated circuit means while still adhering to the same control concepts disclosed for the present invention. While the analog circuit means as herein disclosed can perhaps be most readily implemented at this time with known CMOS technology, it is also recognized that numerous other processes are known to produce such electronic circuit devices, such as DMOS, PHMOS, NMOS, etc. Furthermore, it is also recognized that various type semiconductor elements other than transistors can be employed for active devices herein illustrated for the disclosed control circuitry. Consequently, it is intended to limit the present invention only by the scope of the appended claims.

What we claim as new and desire to secure by letters Patent of the United States is:

1. In a system to regulated electrical power input in an electric heating apparatus utilizing at least one resistive heating element in combination:

(a) a piezoceramic relay device connected in circuit relationship to enable connection of a power source to the heating element, the piezoceramic relay device including a movable polarized piezoceramic bender member and movable electrical contact means which coact with fixed electrical contact means disposed thereby, the piezoceramic bender member maintaining the movable electrical contact means spaced apart from the fixed electrical contact means while the heating element is in an unenergized condition, the movable electrical contact means being connected to an electrically conductive spring element, the bender member and the spring element being operatively connected by an insulating means for common movement, the piezoceramic relay device including clamping means being secured at portions adjacent to and mechanically supporting the bender member and the spring element in a cantilever manner for operating the coacting electrical contact means, and (b) control circuitry responsive to a power setting selected by an operator, the circuitry being directly and ohmically connected to the piezoceramic relay device, the control circuitry generating control signals for actuation of the movable piezoceramic bender member and causing the bender member to deflect and complete a circuit between the power source and the heating element.

2. The power regulating system of claim 1 wherein the control circuitry responds to a power setting selected by an operator from a plurality of available power settings.

3. The power regulating system of claim 1 wherein the control circuitry is made further responsive to control signals derived with temperature sensing means.

4. The power regulating system of claim 3 wherein the temperature achieved when the heating element is operated is determined with temperature feedback control means.

5. The power regulating system of claim 4 wherein the temperature feedback control means derives an error signal which is the function of the difference between the sensed temperature and a predetermined temperature setting.

6. The power regulating system of claim 5 wherein the predetermined temperature setting is selected by an operator from a plurality of available temperature settings.

7. The power regulating system of claim 1 wherein the piezoceramic bender member is formed by at least two planar prepoled piezoceramic plate elements secured in opposed parallel relationship sandwich fashion on opposite sides of at least one central conductive surface and having outer conductive surfaces that are insulated from each other and the central conductive surface by the respective intervening piezoceramic plate element thicknesses.

8. The power regulating system of claim 1 wherein the control circuitry includes additional switching means also responsive to a power setting selected by an operator which interrupt power being supplied to the heating element.

9. The power regulating system of claim 1 wherein the control circuitry further includes a diode-capacitor network for developing a high voltage DC energizing potential to actuate the piezoceramic relay device.

10. The power regulating system of claim 7 wherein the energizing potential to actuate the piezoceramic relay device has the same polarity as the polarity of the potential used to initially polarize the piezoceramic bender member.

11. In a system to regulate electric power input in an electric heating apparatus having a surface cooking mechanism which employs at least one resistive heating element, the combination comprising:
(a) a piezoceramic relay device connected in circuit relationship to enable connection of a power source to the heating element, the piezoceramic relay device including a movable polarized piezoceramic bender member and movable electrical contact means which coact with fixed electrical contact means disposed thereby, the piezoceramic bender member maintaining the movable electrical contact means spaced apart from the fixed electrical contact means while the heating element is in an unenergized condition, the movable electrical contact means being connected to an electrically conductive spring element, the bender member and the spring element being operatively connected by an insulating means for common movement, the piezoceramic relay device including clamping means being secured at portions adjacent to and mechanically supporting the bender member and the spring element in a cantilever manner for operating the coacting electrical contact means, and
(b) control circuitry responsive to a power setting selected by an operator and temperature control signals, the circuitry being directly and ohmically connected to the piezoceramic relay device, the control circuitry causing the bender member to deflect and complete a circuit between the power source and the heating element.

12. The power regulating system of claim 11 wherein the control circuitry responds to a power setting selected by an operator from a plurality of available power settings.

13. The power regulating system of claim 11 wherein the temperature achieved when the heating element is operated is determined with temperature feedback control means.

14. The power regulating system of claim 13 wherein the temperature feedback control means derives an error signal which is the function of the difference between the sensed temperature and a predetermined temperature setting.

15. The power regulating system of claim 14 wherein the predetermined temperature setting is selected by an operator from a plurality of available temperature settings.

16. The power regulating system of claim 11 wherein the piezoceramic bender member is formed by at least two planar prepoled piezoceramic plate elements secured in opposed parallel relationship sandwich fashion on opposite sides of at least one central conductive surface and having outer conductive surfaces that are insulated from each other and the central conductive surface by the respective intervening piezoceramic plate element thicknesses.

17. The power regulating system of claim 11 wherein the control circuitry includes additional switching means also responsive to a power setting selected by an operator which interrupt power being supplied to the heating element.

18. The power regulating system of claim 11 wherein the control circuitry further includes a diode-capacitor network for developing a high voltage DC energizing potential to actuate the piezoceramic relay device.

19. In a system to regulate electric power input in an electric heating apparatus having an oven cooking mechanism which employs at least one resistive heating element, the combination comprising:
(a) a piezoceramic relay device connected in circuit relationship to enable connection of a power source to the heating element, the piezoceramic relay device including a movable polarized piezoceramic bender member and movable electrical contact means which coact with fixed electrical contact means disposed thereby, the piezoceramic bender member maintaining the movable electrical contact means spaced apart from the fixed electrical contact means while the heating element is in an unenergized condition, the movable electrical contact means being connected to an electrically conductive spring element, the bender member and the spring element being operatively connected by an insulating means for common movement, the piezoceramic relay device including clamping means being secured at portions adjacent to and mechanically supporting the bender member and the spring element in a cantilever manner for operating the coacting electrical contact means, and
(b) control circuitry responsive to a power setting selected by an operator and temperature control signals, the circuitry being directly and ohmically connected to the piezoceramic relay devices, and causing the bender member to deflect and complete a circuit between the power source and the heating element.

20. The power regulating system of claim 19 wherein the temperature achieved when the heating element is operated is determined with temperature feedback control means.

21. The power regulating system of claim 19 wherein the temperature feedback control means derives an error signal which is the function of the difference between the sensed temperature and a predetermined temperature setting.

22. The power regulating system of claim 21 wherein the predetermined temperature setting is selected by an operator from a plurality of available temperature settings.

23. The power regulating system of claim 19 wherein the piezoceramic bender member is formed by at least two planar prepoled piezoceramic plate elements secured in opposed parallel relationship sandwich fashion on opposite sides of at least one central conductive surface and having outer conductive surfaces that are insulated from each other and the central conductive surface by the respective intervening piezoceramic plate element thicknesses.

24. The power regulating system of claim 19 wherein the control circuitry includes additional switching means also responsive to a power setting selected by an operator which interrupt power being supplied to the heating element.

25. The power regulating system of claim 19 wherein the control circuitry further includes a diode-capacitor network for developing a high voltage DC energizing potential to actuate the piezoceramic relay device.

26. A system for regulating AC power input to at least one resistive heating element in an electrical cooking appliance comprising in combination:
 (a) a piezoceramic relay device connected in circuit relationship to enable connection of a power source to the heating element, the piezoceramic relay device including a movable polarized piezoceramic bender member and movable electrical contact means which coact with fixed electrical contact means disposed thereby, the piezoceramic bender member maintaining the movable electrical contact means spaced apart from the fixed electrical contact means while the heating element is in an unenergized condition, the movable electrical contact means being connected to an electrically conductive spring element, the bender member and the spring element being operatively connected by an insulating means for common movement, the piezoceramic relay device including clamping means being secured at portions adjacent to and mechanically supporting the bender member and the spring element in a cantilever manner for operating the coacting electrical contact means,
 (b) control circuitry responsive to a power setting selected by an operator and temperature control signals, the circuitry being directly and ohmically connected to the piezoceramic relay device, the control circuitry causing the bender member to deflect and complete a circuit between the AC power source and the heating element, and
 (c) the control circuitry providing DC energizing potential for actuation of the bender member with interconnected solid state circuit means.

27. The power regulating system of claim 26 wherein the control circuitry responds to a power setting selected by an operator from a plurality of available power settings.

28. The power regulating system of claim 26 wherein the piezoceramic bender member is selectively prepoled with clamping means being secured at non-poled portions adjacent to and mechanically supporting the selectively prepoled bender member in a cantilever manner for operating the coacting electrical contact means, the non-poled portions being mechanically unstrained and electrically neutral.

29. The power regulating system of claim 26 wherein the piezoceramic bender member is formed by at least two planar prepoled piezoceramic plate elements secured in opposed parallel relationship sandwich fashion on opposite sides of at least one central conductive surface and having outer conductive surfaces that are insulated from each other and the central conductive surface by the respective intervening piezoceramic plate element thicknesses.

30. The power regulating system of claim 29 wherein single movable electrical contact means are provided to the piezoceramic bender member.

31. The power regulating system of claim 29 wherein a pair of movable electrical contact means is provided to the piezoceramic bender member.

32. The power regulating system of claim 26 wherein the temperature achieved when the heating element is operated is determined with temperature feedback control means.

33. The power regulating system of claim 32 wherein the temperature feedback control means derives an error signal which is the function of the difference between the sensed temperature and a predetermined temperature setting.

34. The power regulating system of claim 33 wherein the predetermined temperature setting is selected by an operator from plurality of available temperature settings.

35. The power regulating system of claim 26 wherein the control circuitry includes additional switching means also responsive to a power setting selected by an operator and which interrupt power being supplied to the heating element.

36. The power regulating system of claim 35 wherein the control circuitry cooperates with additional switching means to provide power interruption with respect to both power conductors.

37. The power regulating system of claim 26 wherein the solid state circuit means controls the percentage of time the AC power is applied to the heating element in accordance with the power level setting selected by an operator.

38. The power regulating system of claim 26 wherein the solid state circuit means provides the DC energizing potential to the bender member with a pair of high voltage active devices.

39. The power regulating system of claim 38 wherein the control signals are provided to the high voltage active devices with analog circuit means.

40. The power regulating system of claim 39 wherein the analog circuit means comprises a dual comparator network providing control signals to operate the heating element.

41. The power regulating system of claim 40 wherein the dual comparator network comprises first amplifier means which compares an input DC control voltage with a feedback voltage obtained by modifying its output voltage to charge associated capacitor means and applying the first amplifier output voltage to a second amplifier means for comparison with a saw-tooth reference voltage, the output voltage from the second amplifier means providing actuating signals to the bender member.

42. The power regulating system of claim 41 wherein the control signals operate a pair of heating elements with the control signals operating one heating element being derived with a first sawtooth reference voltage having an inverse relationship with respect to a second sawtooth reference voltage used to derived the control signals operating the other heating element in order to avoid simultaneous power application to the heating elements, 43. The power regulating system of claim 42 wherein the analog circuit means derives the sawtooth reference voltages with unijunction relaxation oscillator means connected in circuit relationship with a pair of series connected feedback amplifier means so that the output from the first amplifier means provides the first sawtooth reference voltage and which upon further being applied to the second amplifier means provides the second sawtooth reference voltage.

44. The power regulating system of claim 26 wherein the control circuitry further includes a safety light source connected in circuit relationship to illuminate whenever the heating element is being operated.

45. A system for regulating power input to at least two resistive heating elements in an electrical heating apparatus comprising in combination:
(a) at least two piezoceramic relay devices connected in circuit relationship to enable individual connection of a power source to either heating element, each piezoceramic relay device having a movable piezoceramic bender element connected to the power source, each of the bender elements having movable electrical contact means which coast with fixed electrical contact means disposed thereby, the fixed and movable electrical contact means of each relay device being separately connected to each heating element, and with each of the bender elements maintaining the movable electrical contact means spaced apart from the fixed electrical contact means while the heating elements are in an unenergized condition, the movable electrical contact means being connected to an electrically conductive spring element, the bender member and the spring element being operatively connected by an insulating means for common movement, the piezoceramic relay device including clamping means being secured at portions adjacent to and mechanically supporting the bender member and the spring element in a cantilever manner for operating the coacting electrical contact means,
(b) control circuitry directly and ohmically connected to each said relay device, the control circuitry responding to a power setting selected by an operator for separate actuation of the individual bender elements and causing the actuated bender element to deflect and complete a circuit between the power source and the heating element operatively associated with the actuated bender element.

46. The power regulating system of claim 45 wherein the control circuitry responds to a power setting selected by an operator from a plurality of available power settings.

47. The power regulating system of claim 45 wherein the control circuitry is made further responsive to control signals derived with temperature sensing means.

48. The power regulating system of claim 47 wherein the temperature achieved when the heating elements are operated is determined with temperature feedback control means.

49. The power regulating system of claim 48 wherein the temperature feedback control means derives an error signal which is the function of the difference between the sensed temperature and a predetermined temperature setting.

50. The power regulating system of claim 49 wherein the predetermined temperature setting is selected by an operator from a plurality of available temperature settings.

51. The power regulating system of claim 45 wherein the piezoceramic bender member is formed by at least two planar prepoled piezoceramic plate elements secured in opposed parallel relationship sandwich fashion on opposite sides of at least one central conductive surface and having outer conductive surfaces that are insulated from each other and the central conductive surface by the respective intervening piezoceramic plate element thicknesses.

52. The power regulating system of claim 45 wherein the control circuitry includes additional switching means also responsive to a power setting selected by an operator which interrupt power being supplied to the heating elements.

53. The power regulating system of claim 45 wherein the control circuitry further includes a diode-capacitor network for developing a high voltage DC energizing potential to actuate the piezoceramic relay device.

54. The power regulating system of claim 51 wherein the energizing potential to actuate the piezoceramic relay device has the same polarity as the polarity of the potential used to initially polarize the piezoceramic bender member.

55. A system for regulating AC power input to a pair of heating elements in a household electrical cooking appliance comprising in combination:
(a) a pair of piezoceramic relay devices connected in circuit relationship to enable individual connection of a power source to either heating element, each piezoceramic relay device having a movable polarized piezoceramic bender element and a movable piezoceramic bender contact means which coact with fixed electrical contact means disposed thereby, each of the bender elements maintaining the movable electrical contact means spaced apart from the fixed electrical contact means while the heating elements are in an unenergized condition, the movable electrical contact means being connected to an electrical conductive spring element, the bender member and the spring element being operatively connected by an insulating means for common movement, the piezoceramic relay device including clamping means being secured at portions adjacent to and mechanically supporting the bender member and the spring element in a cantilever manner for operating the coacting electrical contact means,
(b) control circuitry directly and ohmically connected to each of the piezoceramic relay device which responds to a power setting selected by an operator and temperature control means for separate actuation of the individual bender elements and causes the actuated bender element to deflect and complete a circuit between the AC power source and the heating element operatively associated with the actuated bender element, and (c) the control circuitry providing DC energizing potential for such separate actuation of the individual bender elements with interconnected analog circuit means which employs a first dual comparator network providing the control signals to operate one heating element as derived with a first sawtooth reference voltage and a second dual comparator network providing the control signals to operate the other heating element as derived with a second sawtooth reference voltage having an inverse relationship with respect to the first sawtooth reference voltage.

56. The power regulating system of claim 55 wherein each dual comparator network comprises first amplifier means which compares an input DC control voltage with a feedback voltage obtained by modifying its output voltage to charge associated capacitor means and applying the first amplifier output voltage to a second amplifier means for comparison with the sawtooth reference voltage, the output voltage from the second amplifier means providing actuating signals to a pair of high voltage active devices connected in control circuitry in control circuitry to apply the DC energizing potential to each bender member.

57. The power regulating system of claim 56 wherein the analog circuit means derives the sawtooth reference voltages with unijunction relaxation oscillator means connected in circuit relationship with a pair of series connected feedback amplifier means so that the output from the first amplifier means provides the first sawtooth reference and which upon further being applied to the second amplifier means provides the second sawtooth reference voltage.

58. The power regulating system of claim 55 wherein the control circuitry further includes a safety light source connected in circuit relationship to illuminate whenever either heating element is being operated.

59. The power regulating system of claim 55 wherein the temperature control signals are derived in the control circuitry with solid state thermistor means.

60. A system for regulating the AC power input to a pair of resistive heating elements in a household electrical cooking appliance comprising in combination:

(a) a pair of piezoceramic relay devices connected in circuit relationship to enable independent connection of a power source to an individual heating element, each of the piezoceramic relay devices including a movable polarized piezoceramic bender member and movable electrical contact means which coact with fixed electrical contact means disposed thereby to connect to one heating element, and with the other piezoceramic relay device including a movable polarized piezoceramic bender member having movable contact means which coact with fixed electrical contact means disposed thereby to connect with the other heating element, each movable electrical contact means being connected to a electrically conductive spring element, the bender member and the spring element being operatively connected by an insulating means for common movement, the piezoceramic relay device including clamping means being secured at portions adjacent to and mechanically supporting the bender member and the spring element in a cantilever manner for operating the coacting electrical contact means, (b) control circuitry directly and ohmically connected to both piezoceramic relay devices which responds to a power setting selected by an operator and temperature control means for separate actuation of the individual bender members and causes the actuated bender member to deflect and complete a circuit between the AC power source and the heating element operatively associated with the actuated bender member, and (c) the control circuitry providing DC energizing potential for such separate actuation of the individual relay devices with interconnected analog circuit means which employs a first dual comparator network providing the control signals to operate one heating element as derived with a first sawtooth reference voltage and a second dual comparator network providing the control signals to operate the other heating element as derived with a second sawtooth reference voltage having an inverse relationship with respect to the first sawtooth reference voltage.

61. The power regulating system of claim 60 wherein each dual comparator network comprises first amplifier means which compares an input DC control voltage with a feedback voltage obtained by modifying its output voltage to charge associated capacitor means and applying the first amplifier output voltage to a second amplifier means for comparison with the sawtooth reference voltage, the output voltage from the second amplifier means providing actuating signals to a pair of high voltage active devices connected to apply the DC energizing potential to each bender member.

62. The power regulating system of claim 61 wherein the analog circuit means derives the sawtooth reference voltages with unijunction relaxation oscillator means connected in circuit relationship with a pair of series connected feedback amplifier means so that the output from the first amplifier means provides the first sawtooth reference and which upon further being applied to the second amplifier means provides the second sawtooth reference voltage.

63. The power regulating system of claim 60 wherein the control circuitry further includes a safety light source connected in circuit relationship to illuminate whenever either heating element is being operated.

64. The power regulating system of claim 60 wherein the temperature control signals are derived in the control circuitry with solid state thermistor means.

65. An electric range employing at least one resistive heating element comprising in combination:

(a) power setting selector means enabling an operator to select the desired power level of operation for the heating element, (b) temperature control means, (c) a piezoceramic relay device connected in circuit relationship to enable connection of a power source to the heating element, the piezoceramic relay device including a movable polarized piezoceramic bender member and movable electrical contact means which coact with fixed electrical contact means disposed thereby, the piezoceramic bender member maintaining the movable electrical contact means spaced apart from the fixed electrical contact means while the heating element is in an unenergized condition, the movable electrical contact means being connected to an electrically conductive spring element, the bender member and the spring element being operatively connected by an insulating means for common movement, the piezoceramic relay device including clamping means being secured at portions adjacent to and mechanically supporting the bender member and the spring element in a cantilever manner for operating the coacting electrical contact means, and (d) control circuitry responsive to a power setting selected by an operator and temperature control signals, the circuitry being directly and ohmically connected to the piezoceramic relay device, and causing the piezoceramic bender member to deflect and complete a circuit between the power source and the heating element.

66. The electric range of claim 65 wherein the control circuitry further regulates the percentage of time electrical power is applied to the heating element.

67. The electrical range of claim 65 wherein the temperature achieved when the heating element is operated is determined with temperature feedback control means.

68. The electric range of claim 65 wherein the piezoceramic bender member is formed by at least two planar prepoled piezoceramic plate elements secured in opposed parallel relationship sandwich fashion on opposite sides of at least one central conductive surface and having outer conductive surfaces that are insulated from each other and the central conductive surface by the respective intervening piezoceramic plate element thicknesses.

69. The electric range of claim 68 wherein the movable electrical contact means are disposed on at least one of the outer conductive surfaces.

70. The electric range of claim 65 wherein the control circuitry includes user operated switching means also responsive to a power setting selected by an operator which interrupt power being supplied to the heating element.

71. The electric range of claim 65 wherein the control circuitry derives control signals actuating the piezoceramic relay device with interconnected solid state circuit means.

72. The electric range of claim 70 wherein the solid state circuit means provides DC energizing potential to the bender member with a pair of high voltage active devices.

73. The electric range of claim 72 wherein the control signals are provided to the high voltage active devices with analog circuit means.

74. The electric range of claim 73 wherein the analog circuit means comprises a dual comparator network pair providing individual control signals to a pair of heating elements.

75. The electric range of claim 74 wherein each dual comparator network comprises first amplifier means which compares in input DC control voltage with a feedback voltage obtained by modifying its output voltage to charge associated capacitor means and applying the first amplifier output voltage to a second amplifier means for comparison with a sawtooth reference voltage, the output voltage from the second amplifier means providing control signals to each heating element.

76. An electrical range employing at least two resistive heating elements comprising in combination:
(a) power setting selector means enabling an operator to select the desired power level of operation for each heating element,
(b) temperature control means,
(c) a pair of piezoceramic relay devices connected in circuit relationship to enable independent connection of a power source to an individual heating element, one of the piezoceramic relay devices including a movable polarized piezoceramic bender member and movable electrical contact means which coact with fixed electrical contact means disposed thereby to connect the power source with one heating element, with the other piezoceramic relay device including a movable polarized piezoceramic bender member and movable electrical contact means which coact with fixed electrical contact means disposed thereby to connect the power source with the other heating element, each piezoceramic bender member maintaining the movable electrical contact means spaced apart from the fixed electrical contact means while the heating elements are in an unenergized condition, each movable electrical contact means being connected to an electrically conductive spring element, the bender member and the spring element being operatively connected by an insulating means for common movement, the piezoceramic relay device including clamping means being secured at portions adjacent to and mechanically supporting the bender member and the spring element in a cantilever manner for operating the coacting electrical contact means, and
(d) control circuitry directly and ohmically connected to both piezoceramic relay devices which responds to a power setting selected by an operator and temperature control signals for separate actuation of the individual bender members and causes the actuated bender member to deflect and complete a circuit between the power source and the heating element operatively associated with the actuated bender member.

77. The electric range of claim 76 wherein the control circuitry further regulates the percentage of time electrical power is applied to the heating elements.

78. The electric range of claim 76 wherein the temperature achieved when the heating elements are operated is determined with temperature feedback control means.

79. The electric range of claim 76 wherein the piezoceramic bender members are formed by at least two planar prepoled piezoceramic plate elements secured in opposed parallel relationship sandwich fashion on opposite sides of at least one central conductive surface and having outer conductive surfaces that are insulated from each other and the central conductive surface by the respective intervening piezoceramic plate element thicknesses.

80. The electric range of claim 76 wherein the control circuitry includes user operated switching means also responsive to a power setting selected by an operator which interrupt power being supplied to the heating elements.

81. The electric range of claim 76 wherein the control circuitry derives control signals actuating the piezoceramic relay devices with interconnected solid state circuit means.

82. The electric range of claim 81 wherein the solid state circuit means provides DC energizing potential to the bender members with a pair of high voltage active devices.

83. The electric range of claim 82 wherein the control signals are provided to the high voltage active devices with analog circuit means.

84. The electric range of claim 83 wherein the analog circuit means comprise a dual comparator network pair providing control signals for the individual heating elements.

85. The electric range of claim 84 wherein each dual comparator network comprises first amplifier means which compares an input DC control voltage with a feedback voltage obtained by modifying its output voltage to charge associated capacitor means and applying the first amplifier output voltage to a second amplifier means for comparison with a sawtooth reference voltage, the output voltage from the second amplifier means providing control signals to each heating element.

86. An electric range including a plurality of resistive heating elements, power setting selector means enabling an operator to select the desired power level of operation for each heating element, temperature control means, and control means to regulate AC power input to the individual heating elements comprising:

(a) a surface cooking mechanism employing at least one resistive heating element, a piezoceramic relay device connected in circuit relationship to enable connection of an AC power source to the heating element, the piezoceramic relay device including a movable polarized piezoceramic bender member and movable electrical contact means which coact with fixed electrical contact means disposed thereby, the piezoceramic bender member maintaining the movable electrical contact means spaced apart from the fixed electrical contact means while the heating element is in an unenergized condition, the movable electrical contact means being connected to an electrically conductive spring element, the bender member and the spring element being operatively connected by an insulating means for common movement, the piezoceramic relay device including clamping means being secured at portions adjacent to and mechanically supporting the bender member and the spring element in a cantilever manner for operating the coacting electrical contact means, (b) control circuity operating the piezoceramic relay device in the surface cooking mechanism response to a power setting selected by an operator and temperature control signals, the control circuitry being directly and ohmically connected to the operatively associated piezoceramic relay device, the control circuitry responding to the control signals for actuation of the movable piezoceramic bender member and causes the bender member to deflect and complete a circuit between the power source and the heating element, (c) an oven cooking mechanism employing at least one second resistive heating element, a second piezoceramic relay device connected in circuit relationship to enable connection of the AC power source to the second heating element, the second piezoceramic relay device including a second movable polarized piezoceramic bender member having second movable electrical contact means which coact with second fixed electrical contact means disposed thereby, the second fixed electrical contact means being connected to the second heating element, and the second piezoceramic bender member maintaining the second movable electrical contact means spaced apart from the second fixed electrical contact means while the second heating element is in an unenergized condition, the second movable electrical contact means being operatively positioned upon a second electrically conductive spring element, the second bender member and the second spring element being operatively connected by a second insulating means for common movement, the second piezoceramic relay device including second clamping means being secured at portions adjacent to and mechanically supporting the second bender member and the second spring element in a cantilever manner for operating the second coacting electrical contact means, and (d) second control circuity operating the second piezoceramic relay device in the oven cooking mechanism responsive to a power setting selected by an operator and second temperature control signals, the second control circuitry being directly and ohmically connected to the AC power source and the operatively associated second piezoceramic relay device which responds to the second control signals for actuation of the second movable piezoceramic bender member and causes the second bender to deflect and complete a second circuit between the power source and the second heating element.

87. The electric range of claim 86 wherein the control circuitry further regulates the percentage of time electrical power is applied to the heating elements.

88. The electric range of claim 86 wherein the temperature achieved when the heating elements are operated is determined with temperature feedback control means.

89. The electric range of claim 86 wherein the piezoceramic bender members are formed by at least two planar prepoled piezoceramic plate elements secured in opposed parallel relationship sandwich fashion on opposite sides of at least one central conductive surface and having outer conductive surfaces that are insulated from each other and the central conductive surface by the respective intervening piezoceramic plate element thicknesses.

90. The electric range of claim 86 wherein the control circuitry includes user operated switching means also responsive to a power setting selected by an operator which interrupt power being supplied to the heating elements.

91. The electric range of claim 86 wherein the control circuitry derives control signals actuating the piezoceramic relay devices with interconnected solid state circuit means.

92. The electric range of claim 91 wherein the solid state circuit means provides DC energizing potential to the bender members with a pair of high voltage active devices.

93. The electric range of claim 92 wherein the control signals are provided to the high voltage active devices with analog circuit means.

94. The electric range of claim 93 wherein the analog circuit means comprises a dual comparator network providing individual control signals to the heating elements.

95. The electric range of claim 94 wherein the dual comparator network comprises first amplifier means which compares an input DC control voltage with a feedback voltage obtained by modifying its output voltage to charge associated capacitor means and applying the first amplifier output voltage to a second amplifier means for comparison with a sawtooth reference voltage, the output voltage from the second amplifier means providing control signals to an individual heating element.

96. An electric range including a plurality of resistive heating elements, power setting selector means enabling an operator to select the desired power level of operation for each heating element, temperature control means, and control means to regulate an AC power input to the individual heating elements comprising:

(a) a surface cooking mechanism employing at least two resistive heating elements, a plurality of piezoceramic relay devices connected in circuit relationship to enable individual connection of the power source to either heating element, each relay device including a movable polarized piezoceramic bender member and movable contact means which coact with fixed electrical contact means disposed thereby, the piezoceramic bender members each maintaining the respective movable electrical contact means spaced apart from the respective fixed electrical contact means while the heating elements are in an unenergized condition, each movable electrical contact means being connected to an electrically conductive spring element, the bender member and the spring element being operatively connected by an insulating means for common movement, the piezoceramic relay device including clamping means being secured at portions adjacent to and mechanically supporting the bender member and the spring element in a cantilever manner for operating the coacting electrical contact means, (b) control circuitry operating the piezoceramic relay devices in the surface cooking mechanism responsive to power settings selected by an operator and temperature control signals to cause one of the bender members to deflect and complete a circuit between the power source and one heating element or a second of the bender members to deflect and complete a circuit between the power source and the other heating element, (c) an oven cooking mechanism employing at least two second resistive heating elements, at least two second piezoceramic relay devices connected in circuit relationship to enable individual connection of the power source to either second heating element, each second relay device including a second movable piezoceramic bender member having second movable contact means which coact with second fixed electrical contact means disposed thereby, the second fixed electrical contact means being connected to each second heating element and the second piezoceramic bender members each maintaining the respective second movable electrical contact means spaced apart from the respective second fixed electrical contact means while the second heating elements are in an unenergized condition, each second movable electrical contact means being connected to a second electrically conductive spring element, the second bender members and the second spring elements being operatively connected by second insulating means for common movement, the second piezoceramic bender members including clamping means being secured at portions adjacent to and mechanically supporting the second bender members and the second spring elements in a cantilever manner for operating the second coacting electrical contact means, and (d) second control circuitry operating the second piezoceramic relay device in the oven cooking mechanism responsive to a power setting selected by an operator and second temperature control signals to cause one of the second bender members to deflect and complete a second circuit between the power source and one second heating element or a second of the second bender members to deflect and complete a circuit between the power source and the other second heating element.

97. The electric range of claim 96 wherein the control circuitry further regulates the percentage of time electrical power is applied to the heating elements.

98. The electric range of claim 96 wherein the temperature achieved when the heating elements are operated is determined with temperature feedback control means.

99. The electric range of claim 96 wherein the piezoceramic bender members are formed by at least two planar prepoled piezoceramic plate elements secured in opposed parallel relationship sandwich fashion on opposite sides of at least one central conductive surface and having outer conductive surfaces that are insulated from each other and the central conductive surface by the respective intervening piezoceramic plate element thicknesses.

100. The electric range of claim 96 wherein the control circuitry includes user operated switching means also responsive to a power setting selected by an operator which interrupt power being supplied to the heating elements.

101. The electric range of claim 96 wherein the control circuitry derives control signals actuating the piezoceramic relay devices with interconnected solid state circuit means.

102. The electric range of claim 101 wherein the solid state circuit means provides DC energizing potential to the bender members with a pair of high voltage active devices.

103. The electric range of claim 102 wherein the control signals are provided to the high voltage active devices with analog circuit means.

104. The electric range of claim 103 wherein the analog circuit means comprises a dual comparator network pair providing control signals to the individual heating elements.

105. The electric range of claim 104 wherein each dual comparator network comprises first amplifier means which compares an input DC control voltage with a feedback voltage obtained by modifying its output voltage to charge associated capacitor means and applying the first amplifier output voltage to a second amplifier means for comparison with a sawtooth reference voltage, the output voltage from the second amplifier means providing control signals to the individual heating elements.

106. A method for regulating power input in an electric heating apparatus utilizing at least one resistive heating element comprising the steps of:

(a) selecting a power setting for the heating element from a plurality of power settings, (b) converting the selected power setting to control signals, and (c) utilizing the control signals to actuate a piezoceramic relay device connected in circuit relationship to enable connection of a power source to the heating element, the piezoceramic relay device including a movable polarized piezoceramic bender member and movable electrical contact means which coact with fixed electrical contact means disposed thereby, the piezoceramic bender member maintaining the movable electrical contact means spaced apart from the fixed electrical contact means while the heating element is in an unenergized condition, the movable electrical contact means being connected to an electrically conductive spring element, the bender member and the spring element being operatively connected by an insulating means for common movement, the piezoceramic relay device including clamping means being secured at portions adjacent to and mechanically supporting the bender member and the spring element in a cantilever manner for operating the coacting electrical contact means.

107. The method of claim 106 wherein the piezoceramic relay device is actuated with DC energizing potential.

108. The method of claim 107 wherein the DC energization potential applied to actuate the piezoceramic relay device has the same polarity as the polarity of the potential used to polarize the piezoceramic relay device.

109. The method of claim 108 wherein the control signals are derived with solid state circuit means.

110. The method of claim 106 wherein the control signals are made further responsive to temperature feedback control means.

111. The method of claim 110 wherein the temperature control signals are derived as an error signal which is the function of the difference between the sensed temperature and a predetermined temperature setting.

112. The method of claim 111 wherein the predetermined temperature setting is selected by an operator from a plurality of available temperature settings.

113. The method of claim 109 wherein the solid state circuit means controls the percentage of time the power is applied to the heating element in accordance with the power level setting selected by the operator.

114. The method of claim 109 wherein the solid state circuit means provides DC energization potential to the bender member with a pair of high voltage active devices.

115. The method of claim 114 wherein the control signals are provided to the high voltage active devices with analog circuit means.

116. The method of claim 115 wherein the analog circuit means comprises a dual comparator network providing control signals to operate the heating element.

117. The method of claim 116 wherein the dual comparator network comprises first amplifier means which compares an input DC control voltage with a feedback voltage obtained by modifying its output voltage to charge associated capacitor means and applying the first amplifier output voltage to a second amplifier means for comparison with a sawtooth reference voltage, the output voltage from the second amplifier means providing actuating signals to the heating element.

118. The method of claim 117 wherein the control signals operate a pair of heating elements with the control signals operating one heating element being derived with a first sawtooth reference voltage having an inverse relationship with respect to a second sawtooth reference voltage used to derive the control signals operating the other heating element in order to avoid simultaneous power application to the heating elements.

119. The method of claim 118 wherein the analog circuit means derives the sawtooth reference voltages with unijunction relaxation oscillator means connected in circuit relationship with a pair of series connected feedback amplifier means so that the output from the first amplifier means provides the first sawtooth reference voltage and which upon further being applied to the second amplifier means provides the second sawtooth reference voltage.

120. A method for regulating power input to an electric range having a surface cooking mechanism which employs at least one resistive heating element, power setting selector means enabling an operator to select the desired power level of operation for an individual heating element, temperature control means, and control means to regulate power input to an individual heating element comprising the steps of:
  (a) selecting a power setting for an individual heating element from a plurality of power settings,
  (b) converting the selected power setting to power control signals,
  (c) utilizing the power control signals to actuate a piezoceramic relay device connected in circuit relationship to enable connection of a power source to the individual heating element, the piezoceramic relay device including a movable polarized piezoceramic bender member and movable electrical contact means which coact with fixed electrical contact means disposed thereby, the piezoceramic bender member maintaining the movable electrical contact means spaced apart from the fixed electrical contact means while the heating element is in an unenergized condition, the movable electrical contact means being connected to an electrically conductive spring element, the bender member and the spring element being operatively connected by an insulating means for common movement, the piezoceramic relay device including clamping means being secured at portions adjacent to and mechanically supporting the bender member and the spring element in a cantilever manner for operating the coacting electrical contact means, and thereby causing the piezoceramic bender member to deflect and complete a circuit between the power source and the individual heating element,
  (d) sensing temperature achieved with the operating heating element to derive temperature control signals, and
  (e) terminating power input to the individual heating element when the sensed temperature reaches a predetermined temperature by causing the coacting contact means of the piezoceramic relay device to open.

121. The method of claim 120 wherein the piezoceramic relay device is actuated with DC energizing potential.

122. The method of claim 121 wherein the DC energization potential applied to actuate the piezoceramic relay device has the same polarity as the polarity of the potential used to polarize the piezoceramic relay device.

123. The method of claim 120 wherein the control signals are derived with solid state circuit means.

124. The method of claim 120 wherein the predetermined temperature setting is selected by an operator from a plurality of available temperature settings.

125. The method of claim 120 wherein the control signals are made further responsive to temperature feedback control means.

126. The method of claim 123 wherein the solid state circuit means controls the percentage of time the power is applied to the heating element in accordance with the power level setting selected by an operator.

127. The method of claim 121 wherein the solid state circuit means provides DC energization potential to the bender member with a pair of high voltage active devices.

128. The method of claim 126 wherein the control signals are provided to the high voltage active devices with analog circuit means.

129. The method of claim 128 wherein the analog circuit means comprises a dual comparator network providing control signals to an individual heating element.

130. The method of claim 129 wherein the dual comparator network comprises first amplifier means which compares an input DC control voltage with a feedback voltage obtained by modifying its output voltage to charge associated capacitor means and applying the first amplifier output voltage to a second amplifier means for comparison with a sawtooth reference voltage, the output voltage from the second amplifier means providing actuating signals to the heating element.

131. The method of claim 130 wherein the control signals operate a pair of heating elements with the control signals operating one heating element being derived with a first sawtooth reference voltage having an inverse relationship with respect to a second sawtooth reference voltage used to derive the control signals operating the other heating element in order to avoid simultaneous power application to the heating elements.

132. The method of claim 131 wherein the analog circuit means derives the sawtooth reference voltages with unijunction relaxation oscillator means connected in circuit relationship with a pair of series connected feedback amplifier means so that the output from the first amplifier means provides the first sawtooth reference voltage and which upon further being applied to the second amplifier means provides the second sawtooth reference voltage.

133. The method of claim 120 wherein the surface cooking mechanism includes at least two resistive heating elements and each heating element is connected to an individual piezoceramic relay device.

134. The method of claim 120 which further includes the step of actuating additional switching means to interrupt power being supplied to an individual heating element when the power setting selector means are turned to an off condition.

135. A method for regulating power input to an electric range having an oven cooking mechanism which employs at least one resistive heating element, power setting selector means enabling an operator to select the desired power level of operation for an individual heating element, temperature control means, and control means to regulate power input to an individual heating element comprising the steps of:
(a) selecting a power setting for an individual heating element from a plurality of power settings,
(b) converting the selected power setting to power control signals,
(c) utilizing the power control signals to actuate a piezoceramic relay device connected in circuit relationship to enable connection of a power source to the individual heating element, the piezoceramic relay device including a movable polarized piezoceramic bender member and movable electrical contact means which coact with fixed electrical contact means disposed thereby, the piezoceramic bender member maintaining the movable electrical contact means spaced apart from the movable electrical contact means while the heating element is in an unenergized condition, the movable electrical contact means being connected to an electrically conductive spring element, the bender member and the spring element being operatively connected by an insulating means for common movement, the piezoceramic relay device including clamping means being secured at portions adjacent to and mechanically supporting the bender member and the spring element in a cantilever manner for operating the coacting electrical contact means, the power control signals causing the piezoceramic bender member to deflect and complete a circuit between the power source and the individual heating element,
(d) sensing temperature achieved with the operating heating element to derive temperature control signals, and
(e) terminating power input to the individual heating element when the sensed temperature reaches a predetermined temperature by causing the coacting contact means of the piezoceramic relay device to open.

136. The method of claim 135 wherein the piezoceramic relay device is actuated with DC energizing potential.

137. The method of claim 136 wherein the DC energizing potential applied to actuate the piezoceramic relay device has the same polarity as the polarity of the potential used to polarize the piezoceramic relay device.

138. The method of claim 135 wherein the control signals are derived with solid state circuit means.

139. The method of claim 136 wherein the predetermined temperature setting is selected by an operator from a plurality of available temperature settings.

140. The method of claim 136 wherein the control signals are made further responsive to feedback control means.

141. The method of claim 138 wherein the solid state circuit means controls the percentage of time the power is applied to the heating element in accordance with the power level setting selected by an operator.

142. The method of claim 138 wherein the solid state circuit means provides DC energization potential to the bender member with a pair of high voltage active devices.

143. The method of claim 142 wherein the control signals are provided to the high voltage active devices with analog circuit means.

144. The method of claim 143 wherein the analog circuit means comprises a dual comparator network providing control signals to an individual heating element.

145. The method of claim 144 wherein the dual comparator network comprises first amplifier means which compares an input DC control voltage with a feedback voltage obtained by modifying its output voltage to charge associated capacitor mean and applying the first amplifier output voltage to a second amplifier means for comparison with a sawtooth reference voltage, the output voltage from the second amplifier means providing actuating signals to the heating element.

146. The method of claim 145 wherein the control signals operate a pair of heating elements with the controls signals operating one heating element being derived with a first sawtooth reference voltage having an inverse relationship with respect to a second sawtooth reference voltage used to derive the control signals operating the other heating element in order to avoid simultaneous power application to the heating elements.

147. The method of claim 146 wherein the analog circuit means derives the sawtooth reference voltages with unijunction relaxation oscillator means connected in circuit relationship with a pair of series connected feedback amplifier means so that the output from the first amplifier means provides the first sawtooth reference voltage and which upon further being applied to the second amplifier means provides the second sawtooth reference voltage.

148. The method of claim 135 wherein the oven cooking mechanism includes at least two resistive heating elements and each heating element is connected to an individual piezoceramic relay device.

149. The method of claim 135 which further includes the step of actuating additional switching means to interrupt power being supplied to an individual heating element when the power setting selector means are turned to an off condition.

150. A method for regulating power input to a plurality of resistive heating elements in an electric range having at least one surface cooking mechanism and at least one oven mechanism, with each mechanism employing at least one resistive heating element, power setting selector means enabling an operator to select the desired power level of operation for an individual heating element in the respective mechanism, temperature control means, and control means to regulate power input to an individual heating element in the respective mechanism comprising the steps of:

(a) selecting a power setting for an individual heating element in the surface cooking mechanism from a plurality of power settings, (b) converting the selected power setting for the individual heating element in the surface cooking mechanism to first power control signals, (c) utilizing the first power control signals for the individual heating element in the surface cooking mechanism to actuate a first piezoceramic relay device connected in circuit relationship to enable connection of a power source to the surface cooking mechanism, the first piezoceramic relay device including a movable polarized piezoceramic bender member and movable electrical contact means which coact with fixed electrical contact means disposed thereby, the piezoceramic bender member maintaining the movable electrical contact means spaced apart from the fixed electrical contact means while the heating element is in an unenergized condition, the movable electrical contact means being connected to an electrically conductive spring element, the bender member and the spring element being operatively connected by an insulating means for common movement, the piezoceramic relay device including clamping means being secured at portions adjacent to and mechanically supporting the bender member and the spring element in a cantilever manner for operating the coacting electrical contact means, the control signals causing the piezoceramic bender member to deflect and complete a circuit between the power source and the individual heating element in the surface cooking mechanism, (d) sensing temperature achieved with the operating heating element in the surface cooking mechanism to derive first temperature control signals, (e) terminating power input to the individual heating element in the surface cooking mechanism when the sensed temperature reaches a predetermined temperature by causing the coacting contact means of the first piezoceramic relay device to open with the first temperature control signals, (f) selecting a power setting for an individual heating element in the oven cooking mechanism from a plurality of power settings, (g) converting the selected power setting for the individual heating element in the oven cooking mechanism to second power control signals, (h) utilizing the second power control signals to actuate a second piezoceramic relay device connected in circuit relationship to enable connection of the power source to the individual heating element in the oven cooking mechanism, the second piezoceramic relay device including a movable polarized piezoceramic bender member and movable electrical contact means which coact with fixed electrical contact means disposed thereby, the piezoceramic bender member maintaining the movable electrical contact means spaced apart from the fixed electrical contact means while the heating element in the oven mechanism is in an unenergized condition, the movable electrical contact means being connected to an electrically conductive spring element, the bender member and the spring element being operatively connected by an insulating means for common movement, the piezoceramic relay device including clamping means being secured at portions adjacent to and mechanically supporting the bender member and the spring element in a cantilever manner for operating the coacting electrical contact means, the control signals causing the piezoceramic bender member to deflect and complete a circuit between the power source and the individual heating element in the oven cooking mechanism, (i) sensing temperature achieved with the operating heating element in the oven cooking mechanism to derive second temperature control signals, and (j) terminating power input to the individual heating element in the oven cooking mechanism when the sensed temperature reaches a predetermined temperature by causing the coacting contact means of the second piezoceramic relay device to open with the second temperature control signals.

151. The method of claim 150 wherein the piezoceramic relay devices are actuated with DC energizing potential.

152. The method of claim 151 wherein the DC energizing potential applied to actuate the piezoceramic relay devices have the same polarity as the polarity of the potential used to polarize the piezoceramic relay devices.

153. The method of claim 150 wherein the control signals are derived with solid state circuit means.

154. The method of claim 150 wherein the predetermined temperature settings are selected by an operator from a plurality of available temperature settings.

155. The method of claim 153 wherein the solid state circuit means controls the percentage of time the power is applied to the heating elements in accordance with the power level settings selected by an operator.

156. The method of claim 153 wherein the solid state circuit means provides DC energization potential to the bender members with a pair of high voltage active devices.

157. The method of claim 156 wherein the control signals are provided to the high voltage active devices with analog circuit means.

158. The method of claim 157 wherein the analog circuit means comprises a dual comparator network providing control signals to operate the heating elements.

159. The method of claim 158 wherein the dual comparator network comprises first amplifier means which compares an input DC control voltage with a feedback voltage obtained by modifying its output voltage to charge associated capacitor means and applying the first amplifier output voltage to a second amplifier means for comparison with a sawtooth reference voltage, the output voltage from the second amplifier means providing actuating signals to the heating elements.

160. The method of claim 159 wherein the control signals operate a pair of heating elements with the control signals operating one heating element being derived with a first sawtooth reference voltage having an inverse relationship with respect to a second sawtooth reference voltage used to derive the control signals operating the other heating element in order to avoid simultaneous power application to the heating elements.

161. The method of claim 160 wherein the analog circuit means derives the sawtooth reference voltages with unijunction relaxation oscillator means connected in circuit relationship with a pair of series connected feedback amplifier means so that the output from the first amplifier means provides the first sawtooth reference voltage and which upon further being applied to the second amplifier means provides the second sawtooth reference voltage.

162. The method of claim 150 wherein at least one of the cooking mechanisms include at least two resistive heating elements and each heating element is connected to an individual piezoceramic relay device.

163. The method of claim 150 which further includes the step of actuating additional switching means to interrupt power being supplied to an individual heating element when the power selector means are turned to an off condition.

* * * * *